US008085263B2

(12) United States Patent
Uehara

(10) Patent No.: US 8,085,263 B2
(45) Date of Patent: Dec. 27, 2011

(54) POWER SUPPLY CIRCUIT, DRIVER CIRCUIT, ELECTRO-OPTICAL DEVICE, ELECTRONIC INSTRUMENT, AND COMMON ELECTRODE DRIVE METHOD

(75) Inventor: Jun Uehara, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 917 days.

(21) Appl. No.: 11/907,084

(22) Filed: Oct. 9, 2007

(65) Prior Publication Data

US 2008/0084410 A1 Apr. 10, 2008

(30) Foreign Application Priority Data

Oct. 10, 2006 (JP) ................................ 2006-276050
Sep. 6, 2007 (JP) ................................ 2007-231032

(51) Int. Cl.
*G06F 3/038* (2006.01)
*G09G 5/00* (2006.01)
*G09G 3/18* (2006.01)
*G09G 3/36* (2006.01)

(52) U.S. Cl. ............ 345/213; 345/54; 345/94; 345/209; 345/211

(58) Field of Classification Search .................... 345/30, 345/33, 48, 50, 53, 54, 55, 84, 87, 94, 204, 345/208, 209, 211, 212, 213
See application file for complete search history.

(56) References Cited

U.S. PATENT DOCUMENTS 6,137,465 A * 10/2000 Sekine et al. .................. 345/98
6,307,681 B1 * 10/2001 Aoki et al. .................... 359/645
7,683,872 B2 * 3/2010 Jan et al. ......................... 345/96
2004/0095342 A1 * 5/2004 Lee et al. ...................... 345/211

FOREIGN PATENT DOCUMENTS

JP A-2004-252022 9/2004

* cited by examiner

*Primary Examiner* — Richard Hjerpe
*Assistant Examiner* — Alecia D English
(74) *Attorney, Agent, or Firm* — Oliff & Berridge, PLC

(57) ABSTRACT

A power supply circuit which outputs a common electrode voltage to a common electrode of an electro-optical device provided opposite to pixel electrodes through an electro-optical material includes a voltage booster circuit which generates a boost voltage boosted by a charge-pump operation in synchronization with a charge clock signal, and a common electrode voltage generation circuit which outputs a high-potential-side voltage or a low-potential-side voltage generated based on the boost voltage to the common electrode as the common electrode voltage. The charge clock signal has a rising edge and a falling edge in a period in which a sign of voltages between the pixel electrode and the common electrode are either positive or negative.

18 Claims, 21 Drawing Sheets

POWER SUPPLY CIRCUIT, DRIVER CIRCUIT, ELECTRO-OPTICAL DEVICE, ELECTRONIC INSTRUMENT, AND COMMON ELECTRODE DRIVE METHOD

Japanese Patent Application No. 2006-276050 filed on Oct. 10, 2006 and Japanese Patent Application No. 2007-231032 filed on Sep. 6, 2007 are hereby incorporated by reference in their entirety.

BACKGROUND OF THE INVENTION

The present invention relates to a power supply circuit, a driver circuit, an electro-optical device, an electronic instrument, and a common electrode drive method, and the like.

As a liquid crystal display (LCD) panel (display panel in a broad sense; electro-optical device in a broader sense) used for electronic instruments such as portable telephones, a simple matrix type LCD panel and an active matrix type LCD panel using a switching element such as a thin film transistor (hereinafter abbreviated as "TFT") have been known.

The simple matrix method can easily reduce power consumption as compared with the active matrix method. On the other hand, it is difficult to increase the number of colors or display a video image using the simple matrix method. The active matrix method is suitable for increasing the number of colors or displaying a video image, but has difficulty in reducing power consumption.

The active matrix type LCD panel is driven so that the polarity of the voltage applied to a liquid crystal (electro-optical material in a broad sense) forming a pixel is reversed alternately. In this case, the voltage level applied to a pixel electrode forming a pixel can be reduced by changing a common electrode voltage (common voltage) supplied to a common electrode opposite to the pixel electrode at the inversion drive timing, whereby power consumption can be reduced.

When driving the active matrix type LCD panel, a high power supply voltage is required for a gate line for selecting the pixel, and a low power supply voltage is required for a source line for supplying a grayscale voltage to the pixel. These power supply voltages are generated by boosting a system power supply voltage by a charge-pump operation which can be realized at low power consumption. For example, power consumption can be further reduced by increasing the cycle of the charge-pump operation when generating a voltage for low-load applications. The high power supply voltage applied to the gate line is generated by the charge-pump operation of which one cycle is two lines (two horizontal scan periods), for example.

However, the boost voltage generated by the charge-pump operation changes in synchronization with the cycle of a charge-pump signal for performing the charge-pump operation. In JP-A-2004-252022, the cycle of the subfield is set to be an integral multiple of the cycle of the charge-pump signal, for example. This enables a horizontal-striped display unevenness appearing in each subfield to be spatially dispersed, whereby the display unevenness in one frame can be eliminated.

A National Television Standards Committee (NTSC) video signal (television signal in a broad sense) is known as a terrestrial analog color television signal. An output operation using the NTSC video signal is necessary when outputting an image and sound using a cathode ray tube (CRT) device. In recent years, a portable electronic instrument (e.g. digital still camera (DSC)) equipped with an LCD panel has also been required to display an image on the LCD panel using the NTSC video signal.

The NTSC video signal is designed so that the number of horizontal scan periods (number of scan lines) within one vertical scan period alternately becomes an even number and an odd number in frame units. On the other hand, a driver circuit drives an LCD panel on the assumption that the number of scan lines in each frame is identical. Therefore, when generating the high power supply voltage of the gate line in a two-line cycle, the boost voltage for generating the common electrode voltage changes every two lines, whereby the voltage of the common electrode changes. This causes a flickering phenomenon, whereby the display quality deteriorates.

According to the technology disclosed in JP-A-2004-252022, when the number of scan lines in each frame differs (e.g. television signal), the number of timings of the charge-pump operation in each frame (number of edges of charge-pump signal) differs. Therefore, the amount of change in the voltage of the common electrode differs depending on the frame, whereby the voltage applied to the liquid crystal changes depending on the frame. This causes a flickering phenomenon, whereby the display quality deteriorates.

SUMMARY

According to one aspect of the invention, there is provided a power supply circuit which outputs a common electrode voltage to a common electrode of an electro-optical device, the common electrode being provided opposite to pixel electrodes, the power supply circuit comprising:

a voltage booster circuit which generates a boost voltage boosted by a charge-pump operation in synchronization with a charge clock signal; and a common electrode voltage generation circuit which outputs a high-potential-side voltage or a low-potential-side voltage to the common electrode as a common electrode voltage, the high-potential-side voltage and the low-potential-side voltage being generated based on the boost voltage;

the charge clock signal having a rising edge and a falling edge in a period in which a sign of voltages between the pixel electrodes and the common electrode are either positive or negative.

According to another aspect of the invention, there is provided a driver circuit for driving an electro-optical device including a plurality of gate lines, a plurality of source lines, a plurality of pixel electrodes, and a plurality of switching elements, a switching element among the plurality of switching elements selected by a gate line among the plurality of gate lines electrically connecting a source line among the plurality of source lines and a pixel electrode among the plurality of pixel electrodes, the driver circuit comprising:

a source line driver circuit that drives the source lines; and the above power supply circuit.

According to a further aspect of the invention, there is provided an electro-optical device comprising:

a plurality of gate lines;

a plurality of source lines;

a plurality of pixel electrodes;

a plurality of switching elements, a switching element among the plurality of switching elements selected by a gate line among the plurality of gate lines electrically connecting a source line among the plurality of source lines and a pixel electrode among the plurality of pixel electrodes;

a common electrode provided opposite to the pixel electrode through an electro-optical material; and the above power supply circuit.

According to still another aspect of the invention, there is provided an electronic instrument comprising the above power supply circuit.

According to a still further aspect of the invention, there is provided an electronic instrument comprising the above electro-optical device.

According to yet another aspect of the invention, there is provided a common electrode drive method for driving a common electrode of an electro-optical device, the common electrode provided opposite to pixel electrodes through an electro-optical material, the method comprising:

generating a boost voltage boosted by a charge-pump operation in synchronization with a charge clock signal; and outputting a high-potential-side voltage or a low-potential-side voltage to the common electrode as a common electrode voltage, the high-potential-side voltage and a low-potential-side voltage being generated based on the boost voltage;

the charge clock signal having a rising edge and a falling edge in a period in which a sign of voltages between the pixel electrodes and the common electrode are either positive or negative.

DETAILED DESCRIPTION OF THE EMBODIMENT

Figure 1:
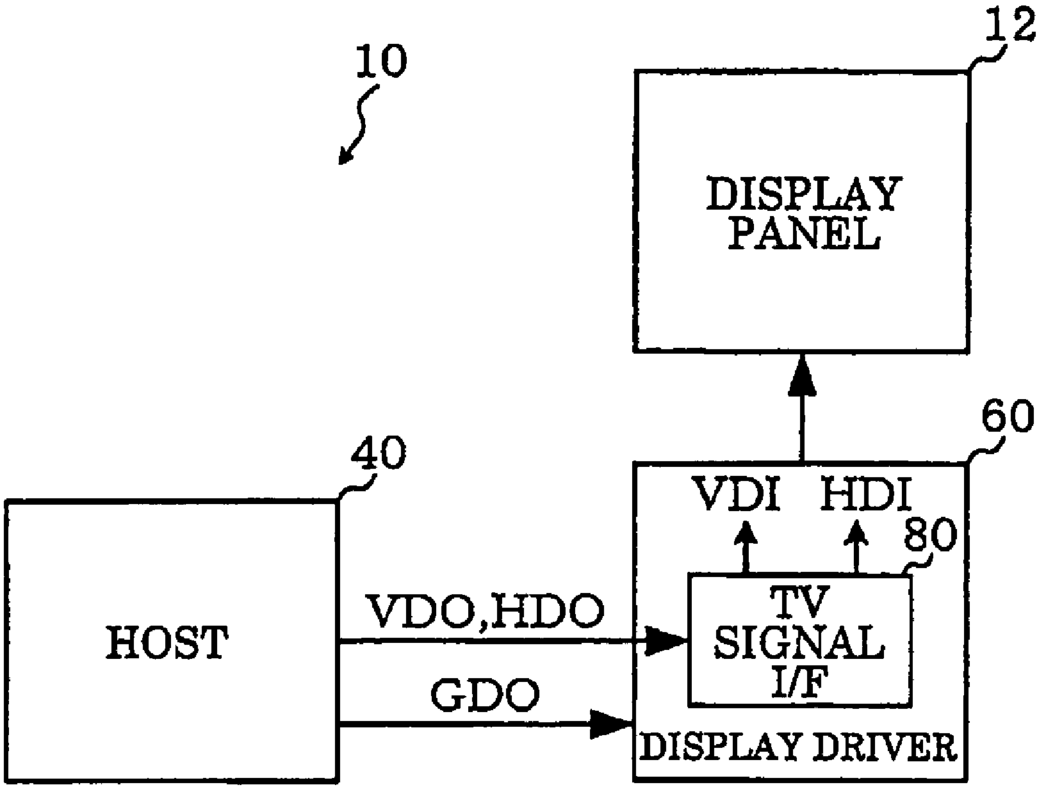
FIG. 1 is a view showing an outline of the configuration of a liquid crystal device to which a display driver according to one embodiment of the invention is applied.

Aspects of the invention may provide a power supply circuit, a driver circuit, an electro-optical device, an electronic instrument, and a common electrode drive method which stabilize display quality by suppressing a flickering phenomenon, even if the number of scan lines of each frame differs.

According to one embodiment of the invention, there is provided a power supply circuit which outputs a common electrode voltage to a common electrode of an electro-optical device, the common electrode being provided opposite to pixel electrodes, the power supply circuit comprising:

a voltage booster circuit which generates a boost voltage boosted by a charge-pump operation in synchronization with a charge clock signal; and a common electrode voltage generation circuit which outputs a high-potential-side voltage or a low-potential-side voltage to the common electrode as a common electrode voltage, the high-potential-side voltage and the low-potential-side voltage being generated based on the boost voltage;

the charge clock signal having a rising edge and a falling edge in a period in which a sign of voltages between the pixel electrodes and the common electrode are either positive or negative.

The power supply circuit may further comprise:

a scan voltage generation circuit which generates a scan voltage applied to a gate line of the electro-optical device;

wherein the scan voltage generation circuit may generate the scan voltage by a charge-pump operation in synchronization with the charge clock signal.

In the power supply circuit, horizontal scan periods in an even number and horizontal scan periods in an odd number may be provided alternately in a vertical scan period; and the common electrode voltage generation circuit may output the common electrode voltage to the common electrode by one-line inversion drive.

In the power supply circuit, a period of one cycle of the charge clock signal may have a length of two times of a horizontal scan period.

According to the above embodiment, the effects of a change in the charge clock signal on the high-potential-side voltage and the low-potential-side voltage of the common electrode voltage can be canceled, even if a frame in which the number of scan lines is an odd number and a frame in which the number of scan lines is an even number are alternately switched. Therefore, the voltage levels of the high-potential-side voltage and the low-potential-side voltage of the common electrode voltage can be made constant in each frame, thereby preventing a situation in which the voltage applied to the electro-optical element changes when the same grayscale voltage is applied to the pixel electrode in each frame. As a result, deterioration in image quality can be prevented. Specifically, a power supply circuit can be provided which stabilizes display quality by suppressing a flickering phenomenon, even if the number of scan lines of each frame differs. According to the above embodiment, deterioration in image quality can be prevented without taking into account the arrangement of the signal line of the charge clock signal, the signal line of the common electrode voltage, the signal line of the high-potential-side voltage, the signal line of the low-potential-side voltage, and the signal line of the boost voltage generated by the charge-pump operation.

In the power supply circuit, a change timing of the charge clock signal may be the same as a change timing of the common electrode voltage.

According to the above embodiment, since the high-potential-side voltage and the low-potential-side voltage of the common electrode voltage change similarly in each frame, the voltage level of the common electrode voltage does not change periodically. As a result, a situation in which the voltage applied to the electro-optical element changes can be prevented, even if the same grayscale voltage is applied to the pixel electrode in each frame.

According to another embodiment of the invention, there is provided a driver circuit for driving an electro-optical device including a plurality of gate lines, a plurality of source lines, a plurality of pixel electrodes, and a plurality of switching elements, a switching element among the plurality of switching elements selected by a gate line among the plurality of gate lines electrically connecting a source line among the plurality of source lines and a pixel electrode among the plurality of pixel electrodes, the driver circuit comprising:

a source line driver circuit that drives the source lines; and the above power supply circuit.

The driver circuit may further comprise a gate line driver circuit for scanning the gate lines.

According to the above embodiment, a driver circuit can be provided which prevents deterioration in image quality by suppressing a change in the common electrode voltage.

According to a further embodiment of the invention, there is provided an electro-optical device comprising:

a plurality of gate lines;

a plurality of source lines;

a plurality of pixel electrodes;

a plurality of switching elements, a switching element among the plurality of switching elements selected by a gate line among the plurality of gate lines electrically connecting a source line among the plurality of source lines and a pixel electrode among the plurality of pixel electrodes;

a common electrode provided opposite to the pixel electrode through an electro-optical material; and the above power supply circuit.

The electro-optical device may further comprise a source line driver circuit that drives the source lines.

According to the above embodiment, an electro-optical device can be provided which prevents deterioration in image quality by suppressing a change in the common electrode voltage.

According to still-another embodiment of the invention, there is provided an electronic instrument comprising the above power supply circuit.

According to a still further embodiment of the invention, there is provided an electronic instrument comprising the above electro-optical device.

According to the above embodiment, an electronic instrument can be provided which prevents deterioration in image quality by suppressing a change in the common electrode voltage.

According to yet another embodiment of the invention, there is provided a common electrode drive method for driving a common electrode of an electro-optical device, the common electrode provided opposite to pixel electrodes through an electro-optical material, the method comprising:

generating a boost voltage boosted by a charge-pump operation in synchronization with a charge clock signal; and outputting a high-potential-side voltage or a low-potential-side voltage to the common electrode as a common electrode voltage, the high-potential-side voltage and a low-potential-side voltage being generated based on the boost voltage;

the charge clock signal having a rising edge and a falling edge in a period in which a sign of voltages between the pixel electrodes and the common electrode are either positive or negative.

In the common electrode drive method, horizontal scan periods in an even number and horizontal scan periods in an odd number may be provided alternately in a vertical scan period; and the common electrode voltage may be output to the common electrode by one-line inversion drive.

In the common electrode drive method, a period of one cycle of the charge clock signal may have a length of two times of a horizontal scan period.

In the common electrode drive method, a change timing of the charge clock signal may be the same as a change timing of the common electrode voltage.

The embodiments of the invention are described below in detail with reference to the drawings. Note that the embodiments described below do not in any way limit the scope of the invention laid out in the claims. Note that all elements of the embodiments described below should not necessarily be taken as essential requirements for the invention.

1. Liquid Crystal Device

FIG. 1 shows an outline of the configuration of a liquid crystal device to which a display driver according to this embodiment is applied.

A liquid crystal device 10 (liquid crystal display device; display device in a broad sense) shown in FIG. 1 includes a display panel 12 (liquid crystal panel or liquid crystal display (LCD) panel in a narrow sense) and a display driver 60 which drives the display panel 12. The liquid crystal device 10 may include a host 40 including a central processing unit (CPU). The host 40 reads a program stored in a memory provided inside or outside the liquid crystal device 10, and processes the program according to the processing procedure. The host 40 generates a vertical synchronization signal VDO, a horizontal synchronization signal HDO, and image data (grayscale data) GDO in accordance with an NTSC system or a phase alternating line (PAL) system, and supplies the vertical synchronization signal VDO, the horizontal synchronization signal HDO, and the image data GDO to the display driver 60.

The display driver 60 includes a television signal interface (hereinafter abbreviated as "I/F") circuit 62. The vertical synchronization signal VDO and the horizontal synchronization signal HDO from the host 40 are input to the television signal I/F circuit 62. The television signal I/F circuit 62 converts the vertical synchronization signal VDO and the horizontal synchronization signal HDO from the host 40 to an internal vertical synchronization signal VDI and horizontal synchronization signal HDI, respectively. The display driver 60 drives the display panel 12 based on the image data from the host 40 in synchronization with the vertical synchronization signal VDI and the horizontal synchronization signal HDI.

2. Specific Configuration

Figure 2:
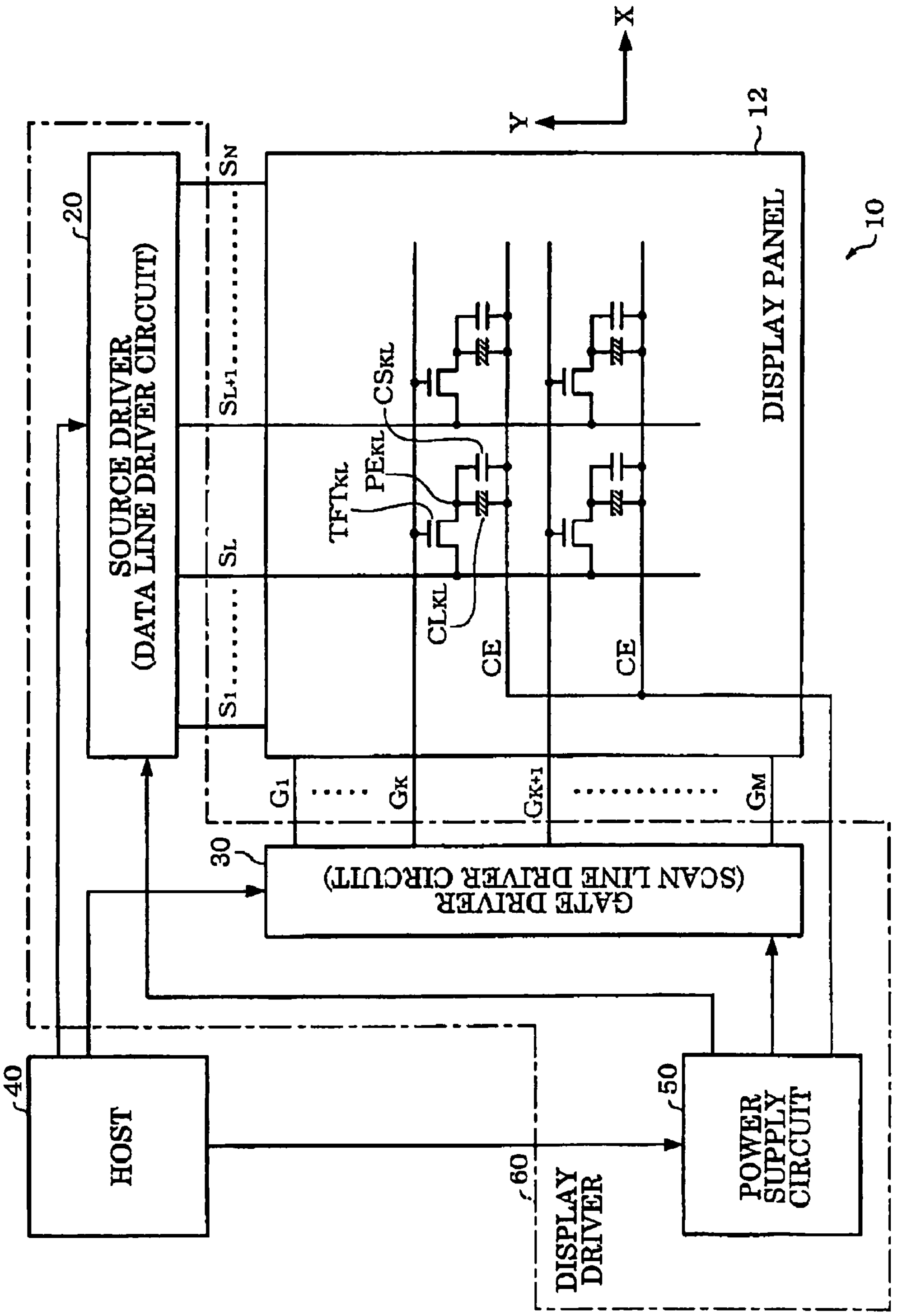
FIG. 2 is a view showing an example of a block diagram of the liquid crystal device shown in FIG. 1.

FIG. 2 shows an example of a block diagram of a liquid crystal device shown in FIG. 1.

The liquid crystal device 10 includes the display panel 12, a source driver 20 (data line driver circuit in a broad sense), a gate driver 30 (scan line driver circuit in a broad sense), the host 40, and a power supply circuit 50. The liquid crystal device 10 need not necessarily include all of these circuit blocks. The liquid crystal device 10 may have a configuration in which some of these circuit blocks are omitted.

The display panel 12 (electro-optical device in a broad sense) includes gate lines (scan lines in a broad sense), source lines (data lines in a broad sense), and pixel electrodes specified by the gate lines and the source lines. In this case, an active matrix type liquid crystal device may be formed by connecting a thin film transistor (TFT; switching element in a broad sense) with the source line and connecting the pixel electrode with the TFT.

Specifically, the display panel 12 is an amorphous silicon liquid crystal panel in which an amorphous silicon thin film is formed on an active matrix substrate (e.g. glass substrate). Gate lines $G_1$ to $G_M$ (M is a positive integer equal to or larger than two), arranged in a direction Y in FIG. 2 and extending in a direction X, and source lines $S_1$ to $S_N$ (N is a positive integer equal to or larger than two), arranged in the direction X and extending in the direction Y, are disposed on the active matrix substrate. A thin film transistor $TFT_{KL}$ (switching element in a broad sense) is provided at a position corresponding to the intersection of the gate line $G_K$ ($1 \leqq K \leqq M$, K is a positive integer) and the source line $S_L$ ($1 \leqq L \leqq N$, L is a positive integer).

A gate electrode of the thin film transistor $TFT_{KL}$ is connected with the gate line $G_K$, a source electrode of the thin film transistor $TFT_{KL}$ is connected with the source line $S_L$, and a drain electrode of the thin film transistor $TFT_{KL}$ is connected with a pixel electrode $PE_{KL}$. A liquid crystal capacitor $CL_{KL}$ (liquid crystal element) and a storage capacitor $CS_{KL}$ are formed between the pixel electrode $PE_{KL}$ and a common electrode CE opposite to the pixel electrode $PE_{KL}$ through a liquid crystal (electro-optical material in a broad sense). The liquid crystal is sealed between the active matrix substrate provided with the thin film transistor $TFT_{KL}$, the pixel electrode $PE_{KL}$, and the like and a common substrate provided with the common electrode CE. The transmissivity of the pixel changes depending on the voltage applied between the pixel electrode $PE_{KL}$ and the common electrode CE.

The voltage level of a common electrode voltage VCOM (high-potential-side voltage VCOMH and low-potential-side voltage VCOML) applied to the common electrode CE is generated by a common electrode voltage generation circuit included in the power supply circuit 50. The common electrode CE is formed over the entire common substrate, for example.

The source driver 20 drives the source lines $S_1$ to $S_N$ of the display panel 12 based on image data. The gate driver 30 scans (sequentially drives) the gate lines $G_1$ to $G_M$ of the display panel 12. The source driver 20 and the gate driver 30 drive the display panel 12 based on the image data been generated by the host 40 in synchronization with the internal vertical synchronization signal VDI and horizontal synchronization signal HDI obtained by respectively converting the vertical synchronization signal VDO and the horizontal synchronization signal HDO generated by the host 40.

The host 40 controls the source driver 20, the gate driver 30, and the power supply circuit 50 according to the processing procedure of a program read from a memory (not shown). Specifically, the host 40 sets the operation mode of the source driver 20 and the gate driver 30 or supplies the vertical synchronization signal and the horizontal synchronization signal generated therein to the source driver 20 and the gate driver 30, and controls the power supply circuit 50 relating to the cycle of a charge-pump operation for a boost operation and polarity inversion timing (polarity inversion cycle) of the voltage level of the common electrode voltage VCOM applied to the common electrode CE, for example.

The power supply circuit 50 generates various voltage levels (grayscale voltages) necessary for driving the display panel 12 and the voltage level of the common electrode voltage VCOM of the common electrode CE based on a reference voltage supplied from the outside.

In the liquid crystal device 10 having such a configuration, the source driver 20, the gate driver 30, and the power supply circuit 50 cooperate to drive the display panel 12 based on image data supplied from the outside under control of the host 40.

In FIG. 2, the liquid crystal device 10 includes the host 40. Note that the host 40 may be provided outside the liquid crystal device 10. Alternatively, some or all of the source driver 20, the gate driver 30, the host 40, and the power supply circuit 50 may be formed on the display panel 12.

In FIG. 2, a display driver 60 may be formed as a semiconductor device (integrated circuit or IC) by integrating the source driver 20, the gate driver 30, and the power supply circuit 50.

Figure 3:
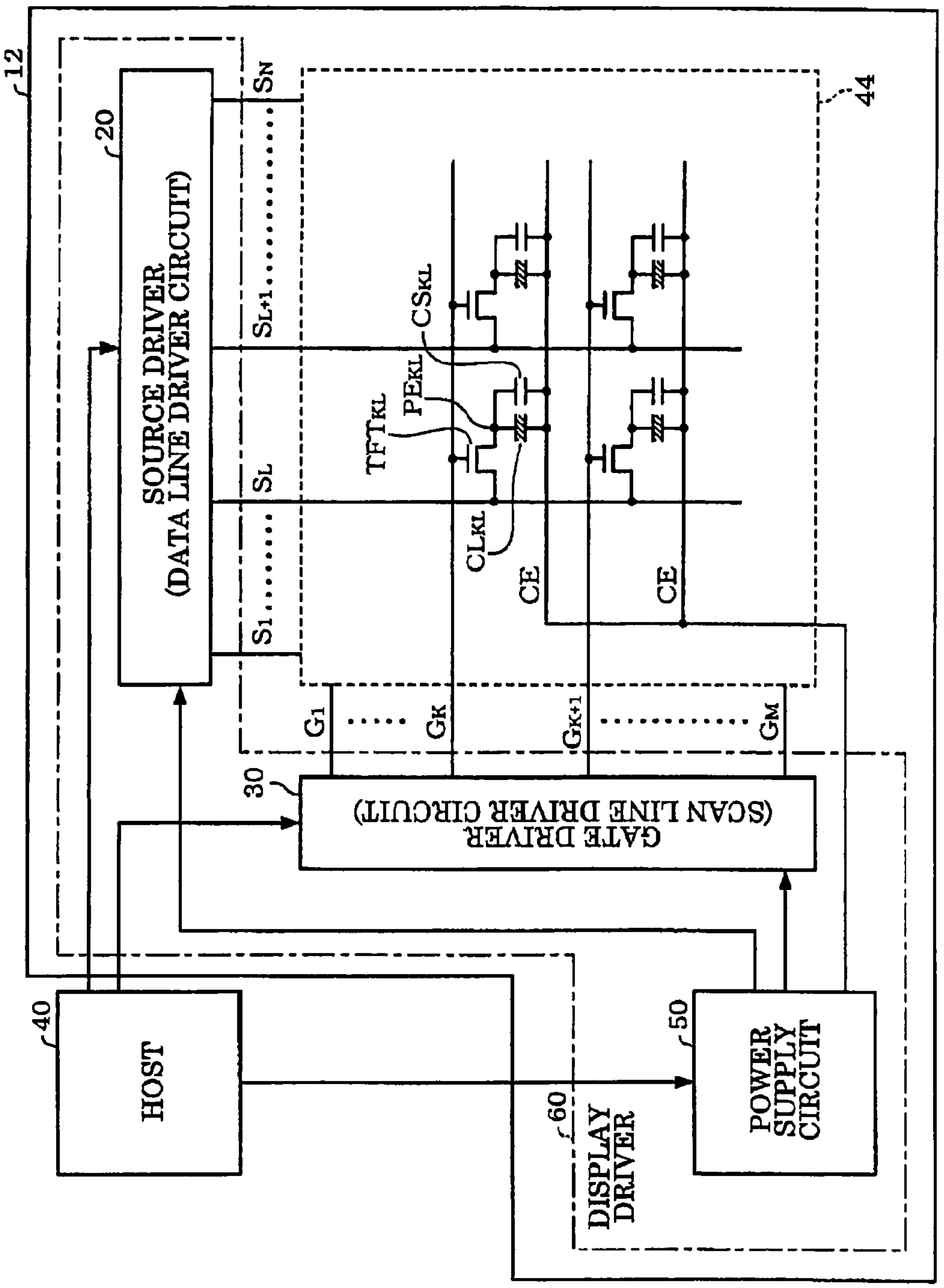
FIG. 3 is a block diagram showing another configuration example of the liquid crystal device according to one embodiment of the invention.

FIG. 3 is a block diagram showing another configuration example of the liquid crystal device according to this embodiment.

In FIG. 3, the display driver 60 including the source driver 20, the gate driver 30, and the power supply circuit 50 is formed on the display panel 12 (panel substrate). Specifically, the display panel 12 may be configured to include gate lines, source lines, pixels (pixel electrodes) connected with the gate lines and the source lines, a source driver which drives the source lines, and a gate driver which scans the gate lines. The pixels are formed in a pixel formation region 44 of the display panel 12. Each pixel may include a TFT of which the source is connected with the source line and the gate is connected with the gate line, and a pixel electrode connected with the drain of the TFT.

In FIG. 3, at least one of the gate driver 30 and the power supply circuit 50 may not be provided on the display panel 12.

In FIG. 2 or 3, the display driver 60 may include the host 40. In FIG. 2 or 3, the display driver 60 may be a semiconductor device in which the source driver 20 or the gate driver 30 and the power supply circuit 50 are integrated.

2.1 Gate Driver

Figure 4:
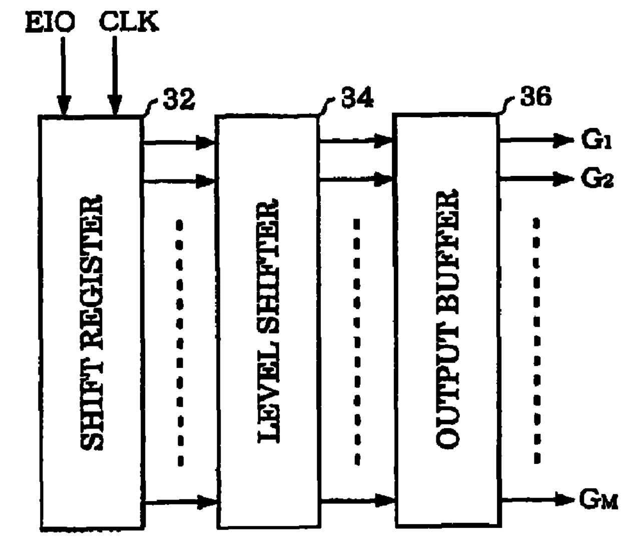
FIG. 4 is a block diagram showing a configuration example of a gate driver shown in FIG. 2 or 3.

FIG. 4 shows a configuration example of the gate driver 30 shown in FIG. 2 or 3.

The gate driver 30 includes a shift register 32, a level shifter 34, and an output buffer 36.

The shift register 32 includes flip-flops provided corresponding to the gate lines and sequentially connected. The shift register 32 holds an enable input-output signal EIO in the flip-flop in synchronization with a clock signal CLK, and sequentially shifts the enable input-output signal EIO to the adjacent flip-flops in synchronization with the clock signal CLK. The enable input-output signal EIO input to the shift register 32 is the internal vertical synchronization signal VDI obtained by converting the vertical synchronization signal VDO from the host 40. The clock signal CLK is the internal horizontal synchronization signal HDI obtained by converting the horizontal synchronization signal HDO from the host 40.

The level shifter 34 shifts the voltage level from the shift register 32 to the voltage level corresponding to the liquid crystal element of the display panel 12 and the transistor capability of the TFT. Since a high voltage level is required as the above voltage level, a high voltage process differing from other logic circuit sections is used for the level shifter 34.

The output buffer 36 buffers the scan voltage shifted by the level shifter 34, and drives the gate line by outputting the scan voltage to the gate line.

2.2 Source Driver

Figure 5:
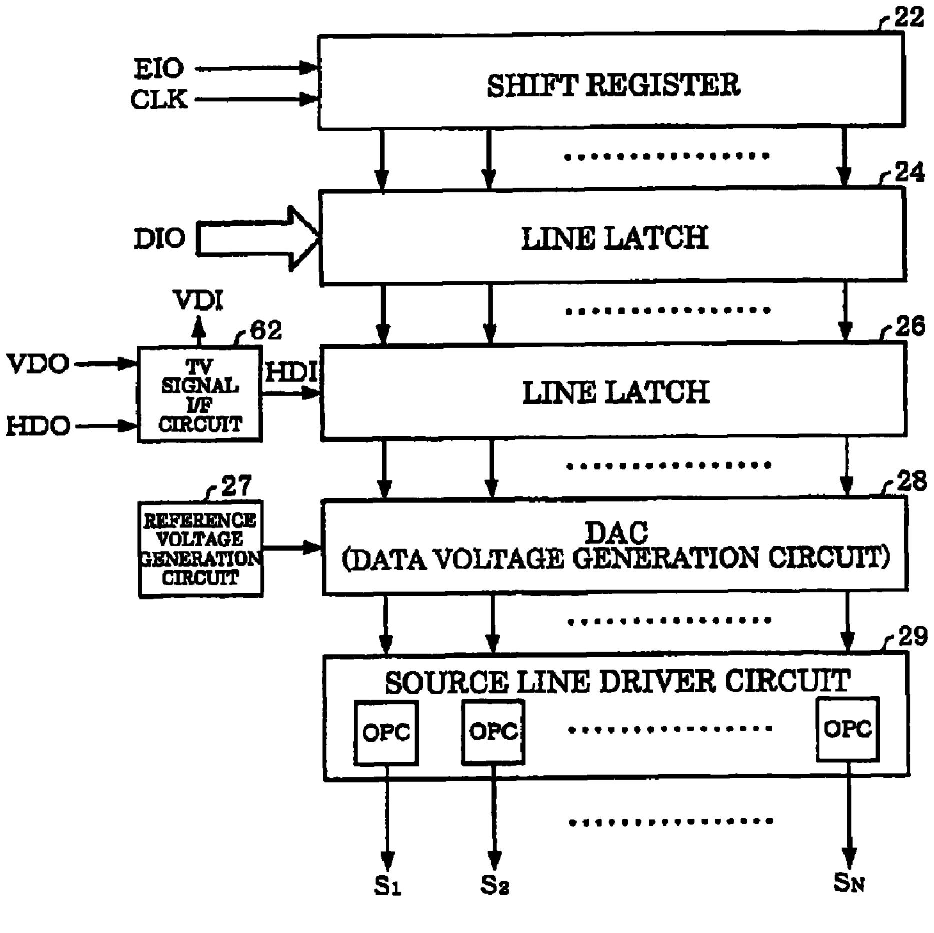
FIG. 5 is a block diagram showing a configuration example of a source driver shown in FIG. 2 or 3.

FIG. 5 is a block diagram showing a configuration example of the source driver 20 shown in FIG. 2 or 3.

The source driver 20 includes a shift register 22, line latches 24 and 26, a television signal I/F circuit 62, a reference voltage generation circuit 27, a digital-to-analog converter (DAC) 28 (data voltage generation circuit in a broad sense), and a source line driver circuit 29.

The shift register 22 includes flip-flops provided corresponding to the source lines and sequentially connected. The shift register 22 holds an enable input-output signal EIO in synchronization with a clock signal CLK, and sequentially shifts the enable input-output signal EIO to the adjacent flip-flops in synchronization with the clock signal CLK.

The image data (DIO) is input to the line latch 24 from the host 40. The image data is expressed by 6 bits per dot, for example. The line latch 24 latches the image data (DIO) in synchronization with the enable input-output signal EIO sequentially shifted by each flip-flop of the shift register 22. Note that the image data may be transmitted in synchronization with a dot clock signal from the host 40, or may be transmitted in accordance with the NTSC system or the PAL system.

The television signal I/F circuit 62 generates the internal vertical synchronization signal VDI and horizontal synchronization signal HDI for the display driver 60 based on the vertical synchronization signal VDO and the horizontal synchronization signal HDO from the host 40.

The line latch 26 latches the image data of one horizontal scan unit latched by the line latch 24 at the edge (rising edge or falling edge) of the horizontal synchronization signal HDI generated by the television signal I/F circuit 62.

The reference voltage generation circuit 27 generates 64 ($=2^6$) reference voltages. The 64 reference voltages generated by the reference voltage generation circuit 27 are supplied to the DAC 28.

The DAC 28 (data voltage generation circuit) generates an analog data voltage supplied to each source line. Specifically, the DAC 28 selects one of the reference voltages from the reference voltage generation circuit 27 based on the digital image data from the line latch 26, and outputs an analog data voltage corresponding to the digital image data.

The source line driver circuit 29 buffers the data voltage from the DAC 28, and drives the source line by outputting the data voltage to the source line. Specifically, the source line driver circuit 29 includes voltage-follower-connected operational amplifier circuit blocks OPC (impedance conversion circuits in a broad sense) provided in source line units. The operational amplifier circuit block OPC subjects the data voltage from the DAC 28 to impedance conversion and outputs the resulting data voltage to the source line.

FIG. 5 employs a configuration in which the digital image data is subjected to digital-analog conversion and output to the source line driver circuit 29. A configuration may also be employed in which an analog image signal is sampled/held and output to the source line through the source line driver circuit 29.

Figure 6:
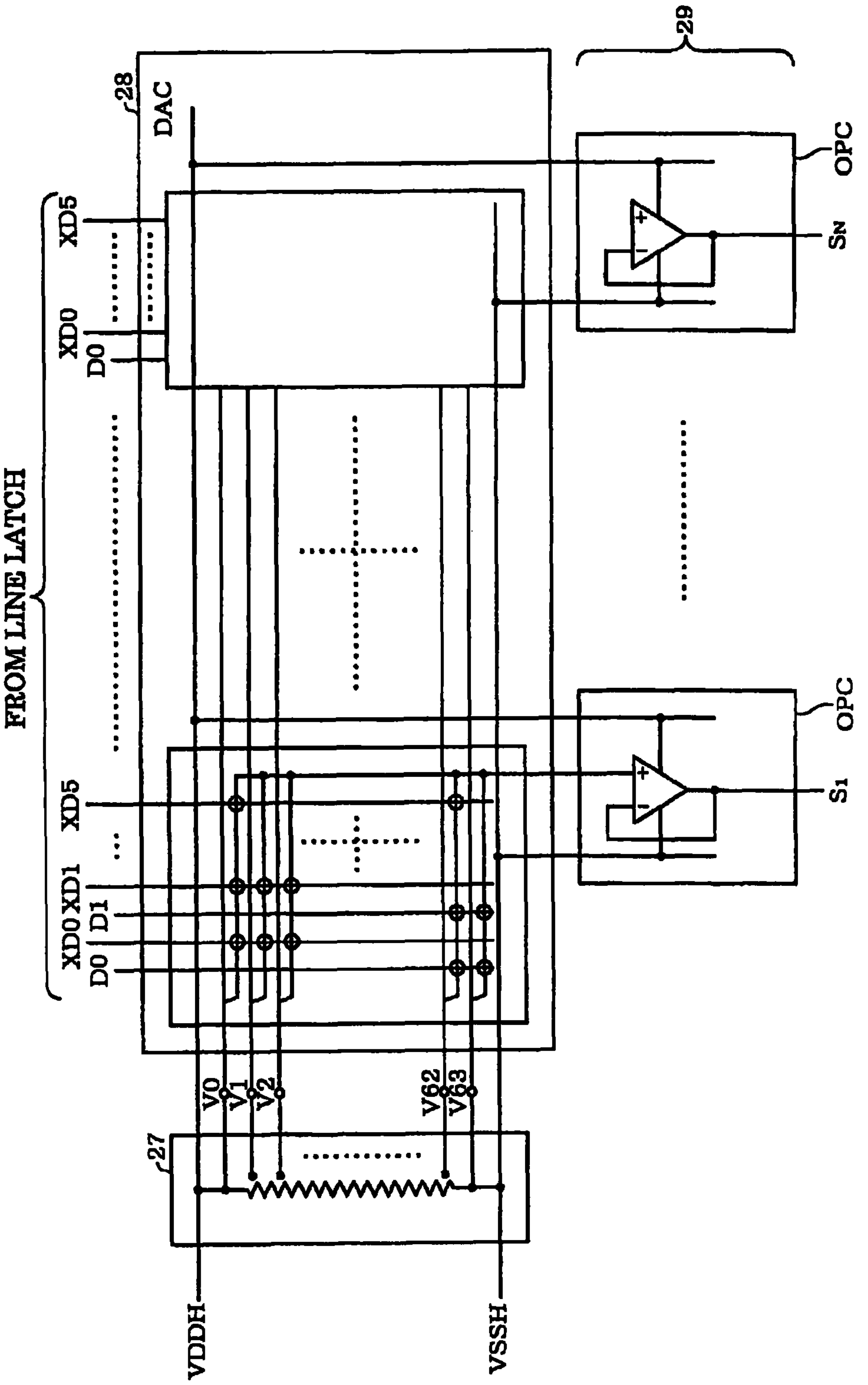
FIG. 6 is a view showing a configuration example of a reference voltage generation circuit, a DAC, and a source line driver circuit shown in FIG. 5.

FIG. 6 shows a configuration example of the reference voltage generation circuit 27, the DAC 28, and the source line driver circuit 29 shown in FIG. 5. In FIG. 6, the image data is made up of 6-bit data D0 to D5, and inversion data of each bit of the image data is indicated by XD0 to XD5. In FIG. 6, the same sections as in FIG. 5 are indicated by the same symbols. Description of these sections is appropriately omitted.

The reference voltage generation circuit 27 generates 64 reference voltages by dividing voltages VDDH and VSSH using resistors. The reference voltages respectively correspond to grayscale values indicated by the six-bit image data. The reference voltage is supplied in common to the source lines $S_1$ to $S_N$.

The DAC 28 includes decoders provided in source line units. The decoders respectively output the reference voltage corresponding to the image data to the operational amplifiers OPC.

2.3 Power Supply Circuit

Figure 7:
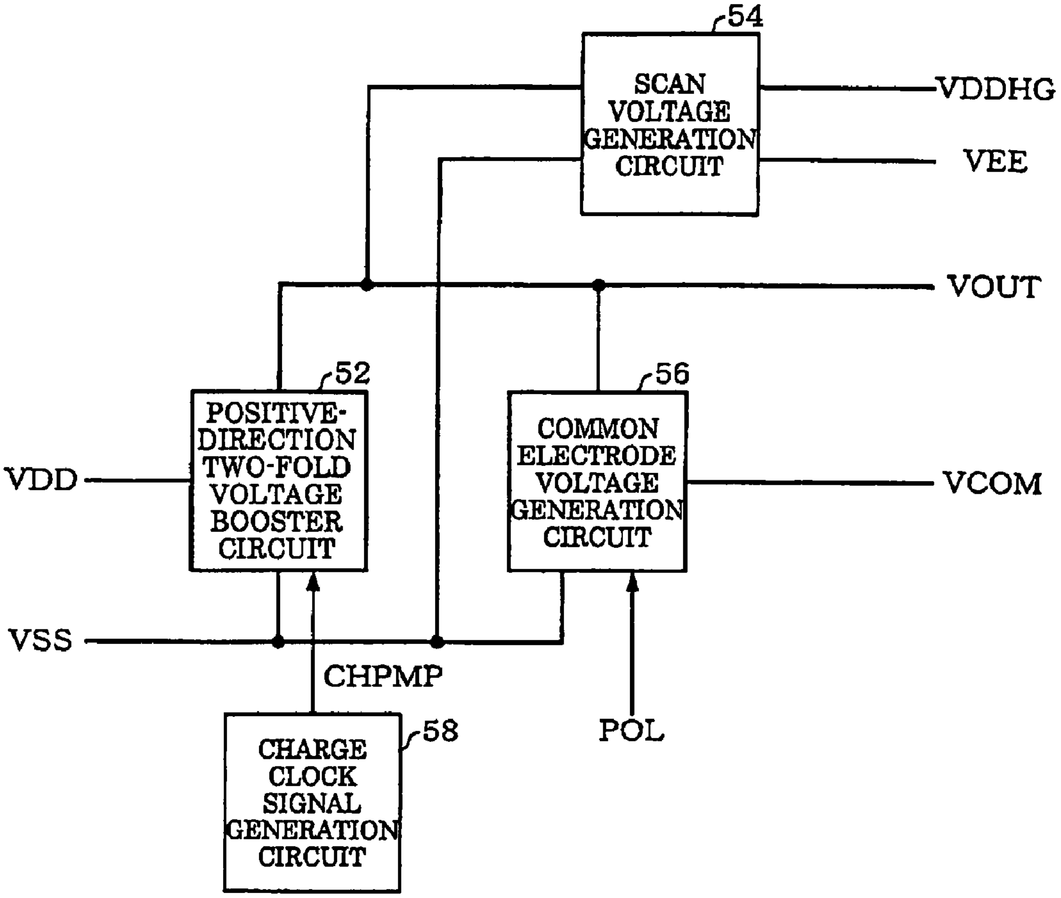
FIG. 7 is a view showing a configuration example of a power supply circuit shown in FIG. 2 or 3.

FIG. 7 shows a configuration example of the power supply circuit 50 shown in FIG. 2 or 3.

The power supply circuit 50 includes a positive-direction two-fold voltage booster circuit 52, a scan voltage generation circuit 54, a common electrode voltage generation circuit 56, and a charge clock signal generation circuit 58. A system ground power supply voltage VSS and a system power supply voltage VDD are supplied to the power supply circuit 50.

The system ground power supply voltage VSS and the system power supply voltage VDD are supplied to the positive-direction two-fold voltage booster circuit 52. The positive-direction two-fold voltage booster circuit 52 generates a power supply voltage VOUT by increasing the system power supply voltage VDD in the positive direction by a factor of two with respect to the system ground power supply voltage VSS. Specifically, the positive-direction two-fold voltage booster circuit 52 increases the difference between the system ground power supply voltage VSS and the system power supply voltage VDD by a factor of two. The positive-direction twofold voltage booster circuit 52 may be formed using a known charge-pump circuit. The power supply voltage VOUT is supplied to the source driver 20, the scan voltage generation circuit 54, and the common electrode voltage generation circuit 56. It is preferable that the positive-direction two-fold voltage booster circuit 52 output the power supply voltage VOUT obtained by increasing the system power supply voltage VDD in the positive direction by a factor of two by increasing the system power supply voltage VDD by a factor of two or more and adjusting the voltage level using a regulator.

The charge clock signal generation circuit 58 generates a charge clock signal CHPMP in a specific cycle based on a reference clock signal (not shown). The positive-direction two-fold voltage booster circuit 52 performs a charge-pump operation in synchronization with the charge clock signal CHPMP.

The system ground power supply voltage VSS and the power supply voltage VOUT are supplied to the scan voltage generation circuit 54. The scan voltage generation circuit 54 generates a scan voltage. The scan voltage is a voltage applied to the gate line driven by the gate driver 30. The high-potential-side voltage and the low-potential-side voltage of the scan voltage are voltages VDDHG and VEE, respectively.

The common electrode voltage generation circuit 56 generates the common electrode voltage VCOM. The common electrode voltage generation circuit 56 outputs the high-potential-side voltage VCOMH or the low-potential-side voltage VCOML as the common electrode voltage VCOM based on a polarity inversion signal POL. The polarity inversion signal POL is generated by the host 40 in synchronization with the polarity inversion timing.

Figure 8:
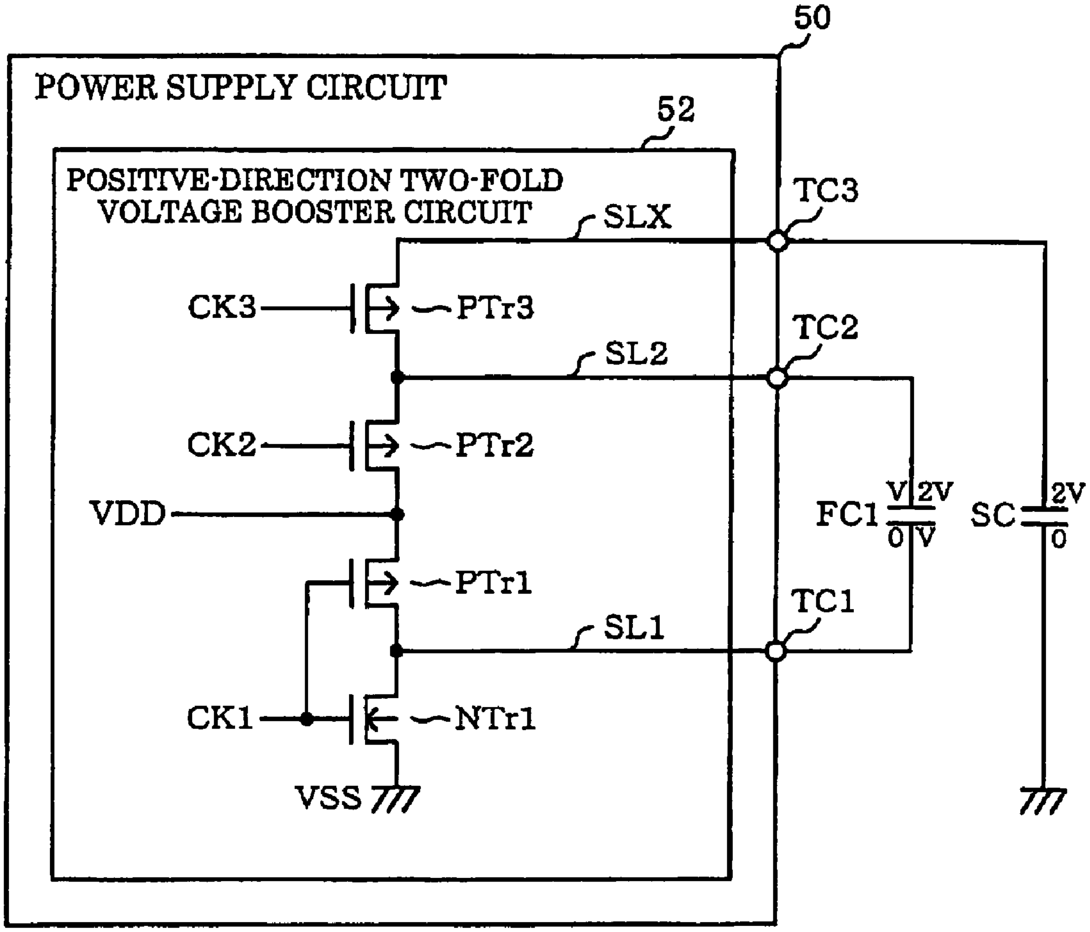
FIG. 8 is a circuit diagram showing a configuration example of a positive-direction two-fold voltage booster circuit shown in FIG. 7.

FIG. 8 shows a configuration example of the positive-direction two-fold voltage booster circuit 52 shown in FIG. 7. In FIG. 8, the same sections as shown in FIG. 7 are indicated by the same symbols. Description of these sections is appropriately omitted. In FIG. 8, the charge-pump circuit performs a twofold boost operation. Note that this embodiment is not limited to the boost factor.

The positive-direction two-fold voltage booster circuit 52 includes transistors as switching elements. Each transistor is switch-controlled using the charge clock signal CHPMP generated by the charge clock signal generation circuit 58. The charge clock signal CHPMP includes charge clock signals CK1 to CK3.

The positive-direction two-fold voltage booster circuit 52 includes a P-type (first conductivity type) metal-oxide-semiconductor (MOS) transistor (MOS transistor is hereinafter abbreviated as "transistor") PTr1 of which the source is connected with the system power supply voltage VDD, and an N-type (second conductivity type) transistor NTr1 of which the drain is connected with the drain of the transistor PTr1. The system ground power supply voltage VSS is supplied to the source of the transistor NTr1. A charge clock signal CK1 is supplied to the gates of the transistors PTr1 and NTr1.

The positive-direction two-fold voltage booster circuit 52 includes P-type transistors PTr2 and PTr3. The system power supply voltage VDD is supplied to the drain of the transistor PTr2, and the source of the transistor PTr2 is connected with the drain of the P-type transistor PTr3. The source of the transistor PTr3 is connected with a connection terminal TC3 of the power supply circuit 50 (or display driver 60) via an output signal line SLX. A charge clock signal CK2 is supplied to the gate of the transistor PTr2. A charge clock signal CK3 is supplied to the gate of the transistor PTr3.

The power supply circuit 50 (or display driver 60) includes connection terminals TC1 to TC3. The connection terminal TC1 and the connection node (drain node) of the transistors PTr1 and NTr1 are electrically connected via a signal line SL1. The connection terminal TC2 and the connection node of the transistors PTr2 and PTr3 are electrically connected via a signal line SL2.

A flying capacitor FC1 is connected between the connection terminals TC1 and TC2 outside the power supply circuit 50 (or display driver 60). A stabilization capacitor SC is connected between the connection terminal TC3 and a power supply line to which the system ground power supply voltage VSS is supplied.

The positive-direction two-fold voltage booster circuit 52 shown in FIG. 8 outputs a boost voltage of 2 V, obtained by boosting the voltage V between the system power supply voltage VDD and the system ground power supply voltage VSS by a factor of two, to the connection terminal TC3.

Figure 9:
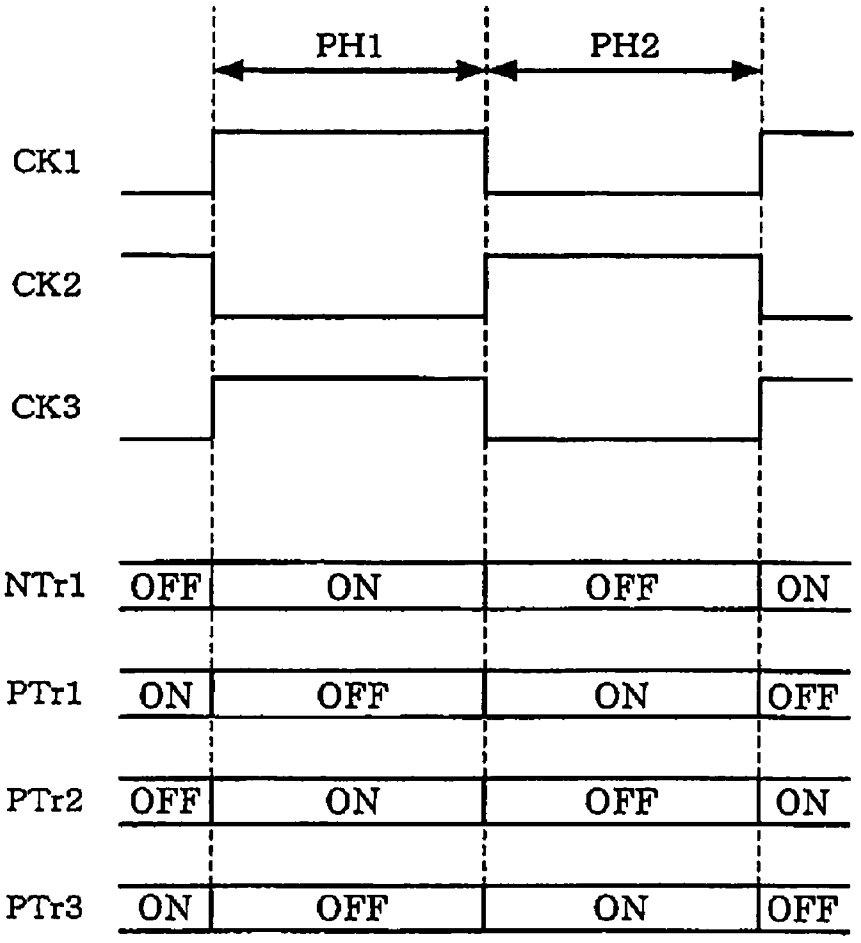
FIG. 9 is a view illustrative of an example of timings of charge clock signals and a control state of each transistor.

FIG. 9 shows an example of the timings of the charge clock signals CK1 to CK3 and the control state of each transistor. In FIG. 9, the rising edge and the falling edge of each charge clock signal occur at the same timing. It is preferable to cause the rising edge and the falling edge of each charge clock signal to occur at different timings so that two transistors connected in series are not simultaneously turned ON (an OFF-OFF period is provided).

In a period PH1, the transistor NTr1 is turned ON and the transistor PTr1 is turned OFF, whereby the system ground power supply voltage VSS is supplied to one end of the flying capacitor FC1 connected with the connection terminal TC1. In this case, since the transistor PTr2 is turned ON and the transistor PTr3 is turned OFF, the other end of the flying capacitor FC1 connected with the connection terminal TC2 is connected with the power supply line to which the system power supply voltage VDD is supplied via the signal line SL2. Therefore, the flying capacitor FC1 stores a charge corresponding to the voltage V between the system power supply voltage VDD and the system ground power supply voltage VSS in the period PH1.

In a period PH2, the transistor NTr1 is turned OFF and the transistor PTr1 is turned ON, whereby one end of the flying capacitor FC1 connected with the connection terminal TC1 is connected with the power supply line to which the system power supply voltage VDD is supplied. Since the transistor PTr2 is turned OFF and the transistor PTr3 is turned ON, a voltage of 2 V is supplied to one end of the stabilization capacitor SC via the output signal line SLX and then held by the stabilization capacitor SC.

Figure 10:
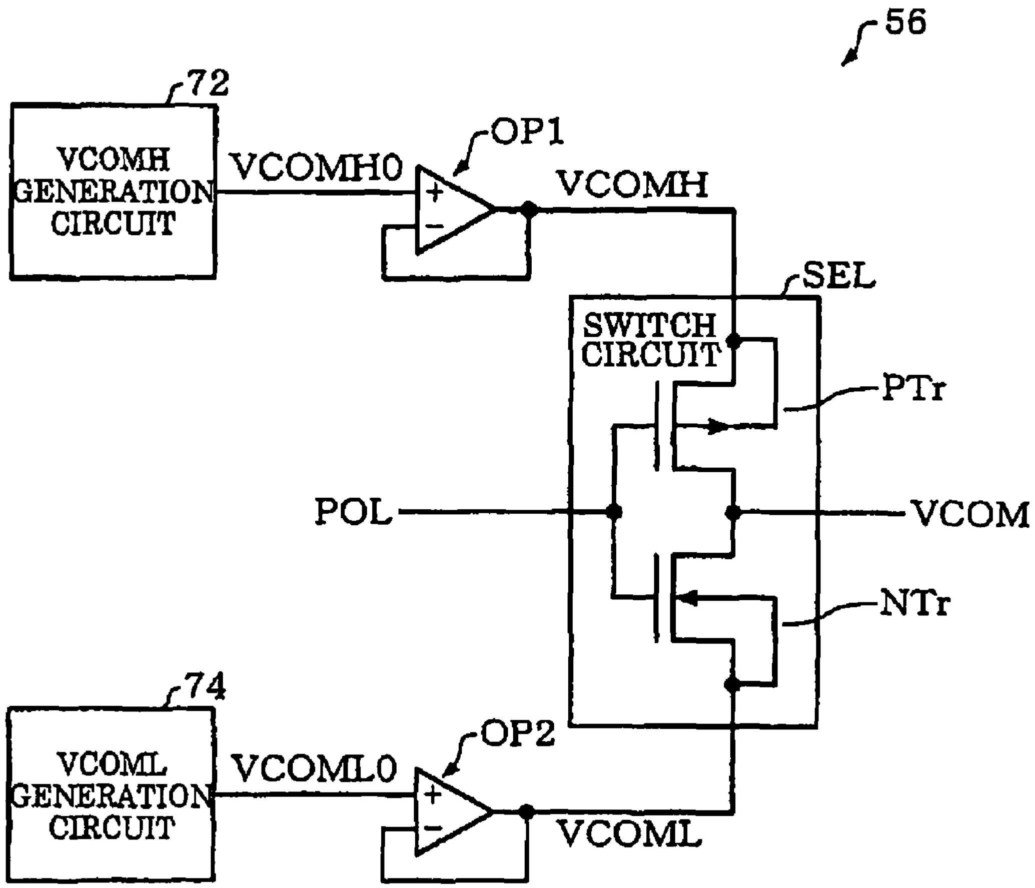
FIG. 10 is a circuit diagram showing a configuration example of a common electrode voltage generation circuit shown in FIG. 7.

FIG. 10 shows a configuration example of the common electrode voltage generation circuit 56 shown in FIG. 7.

The common electrode voltage generation circuit 56 generates the common electrode voltage VCOM applied to the common electrode CE opposite to the pixel electrode of the display panel 12 (electro-optical device) through the liquid crystal element (electro-optical material). The common electrode voltage generation circuit 56 includes first and second operational amplifiers OP1 and OP2 which are voltage-follower-connected operational amplifiers, and a switch circuit SEL. The first operational amplifier OP1 as a first common electrode voltage generation circuit outputs the high-potential-side voltage VCOMH of the common electrode voltage VCOM. The second operational amplifier OP2 as a second common electrode voltage generation circuit outputs the low-potential-side voltage VCOML of the common electrode voltage VCOM. The switch circuit SEL outputs one of the high-potential-side voltage VCOMH and the low-potential-side voltage VCOML as the common electrode voltage VCOM at the polarity inversion timing at which the polarity (sign) of the voltage applied to the liquid crystal element (electro-optical material) is reversed. The first and second operational amplifiers OP1 and OP2 may operate as regulators.

The polarity inversion signal POL which specifies the polarity reversal timing or an inversion signal of the polarity inversion signal POL is input to the common electrode voltage generation circuit 56. In FIG. 10, the polarity inversion signal POL is input to the common electrode voltage generation circuit 56.

The switch circuit SEL may include a P-type transistor PTr and an N-type (second conductivity type) transistor NTr. The source of the transistor PTr is connected with the output of the first operational amplifier OP1. The drain of the transistor PTr is electrically connected with the common electrode CE. The polarity inversion signal POL is supplied to the gate of the transistor PTr. The source of the transistor NTr is connected with the output of the second operational amplifier OP2. The drain of the transistor NTr is electrically connected with the common electrode CE. The polarity inversion signal POL is supplied to the gate of the transistor NTr.

The common electrode voltage generation circuit 56 may include a VCOMH generation circuit 72 (common electrode high-potential-side voltage generation circuit) and a VCOML generation circuit 74 (common electrode low-potential-side voltage generation circuit). The VCOMH generation circuit 72 can generate a voltage VCOMH0 by a charge-pump operation based on the system ground power supply voltage VSS and the power supply voltage VOUT, for example. The voltage VCOMH0 is supplied to the input of the first operational amplifier OP1. The VCOML generation circuit 74 can generate a voltage VCOML0 by a charge-pump operation based on the system ground power supply voltage VSS and the power supply voltage VOUT, for example. The voltage VCOML0 is supplied to the input of the second operational amplifier OP2. The switch circuit SEL outputs the high-potential-side voltage VCOMH or the low-potential-side voltage VCOML as the common electrode voltage VCOM based on the polarity inversion signal POL.

Figure 11:
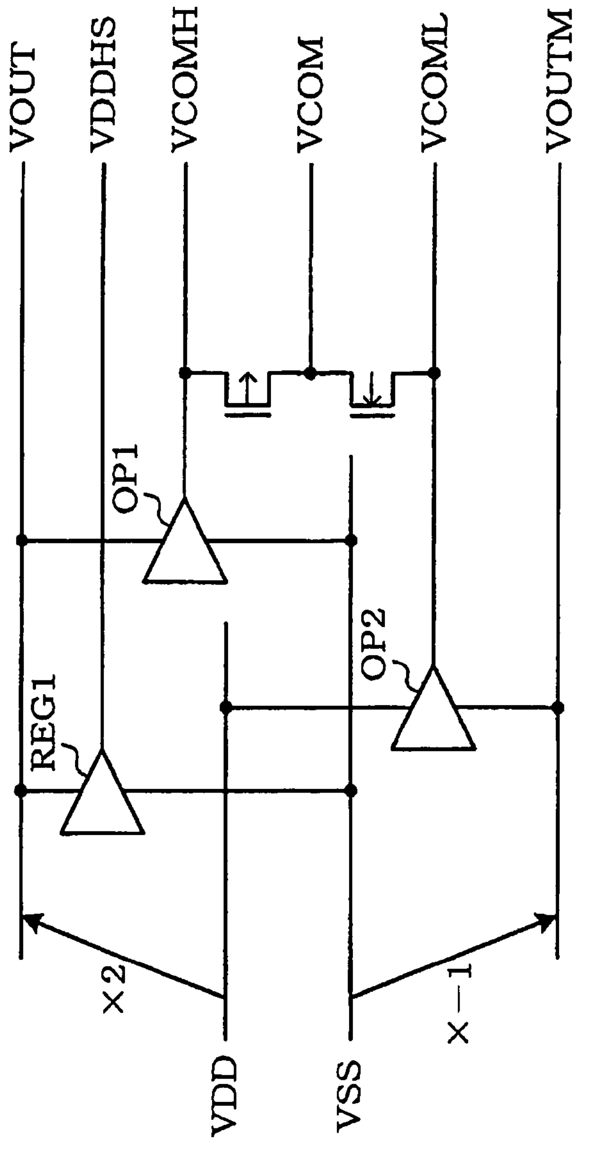
FIG. 11 is a view schematically showing the relationship among power supply voltages generated by the power supply circuit according to one embodiment of the invention.

FIG. 11 schematically shows the relationship among the power supply voltages generated by the power supply circuit 50 according to this embodiment. FIG. 11 shows the potential relationship among the voltages VOUT, VDDHS, VCOMH, VCOM, VCOML, and VOUTM with the voltages VDDHG and VEE omitted.

The voltage VOUT is a voltage obtained by boosting the voltage between the system power supply voltage VDD and the system ground power supply voltage VSS in the positive direction by a factor of two with respect to the system ground power supply voltage VSS. The positive-direction two-fold voltage booster circuit 52 of the power supply circuit 50 may include an operational amplifier REG1 which functions as a regulator. The high-potential-side power supply voltage of the operational amplifier REG1 is the voltage VOUT, and the low-potential-side power supply voltage of the operational amplifier REG1 is the system ground power supply voltage VSS. The operational amplifier REG1 outputs the voltage VDDHS.

The common electrode voltage generation circuit 56 of the power supply circuit 50 includes the first and second operational amplifiers OP1 and OP2 which function as regulators. The high-potential-side power supply voltage of the first operational amplifier OP1 is the voltage VOUT, and the low-potential-side power supply voltage of the first operational amplifier OP1 is the system ground power supply voltage VSS. The first operational amplifier OP1 outputs the voltage VCOMH. The voltage VOUTM is a voltage obtained by boosting the voltage between the system power supply voltage VDD and the system ground power supply voltage VSS in the negative direction by a factor of one (−1) with respect to the system ground power supply voltage VSS. The high-potential-side power supply voltage of the second operational amplifier OP2 is the voltage VDD, and the low-potential-side power supply voltage of the second operational amplifier OP2 is the voltage VOUTM. The second operational amplifier OP2 outputs the voltage VCOML. The common electrode voltage generation circuit 56 outputs one of the high-potential-side voltage VCOMH and the low-potential-side voltage VCOML respectively generated by the first and second operational amplifiers OP2 and OP3 as the common electrode voltage VCOM based on the polarity inversion signal POL, as shown in the FIG. 10.

Figure 12:
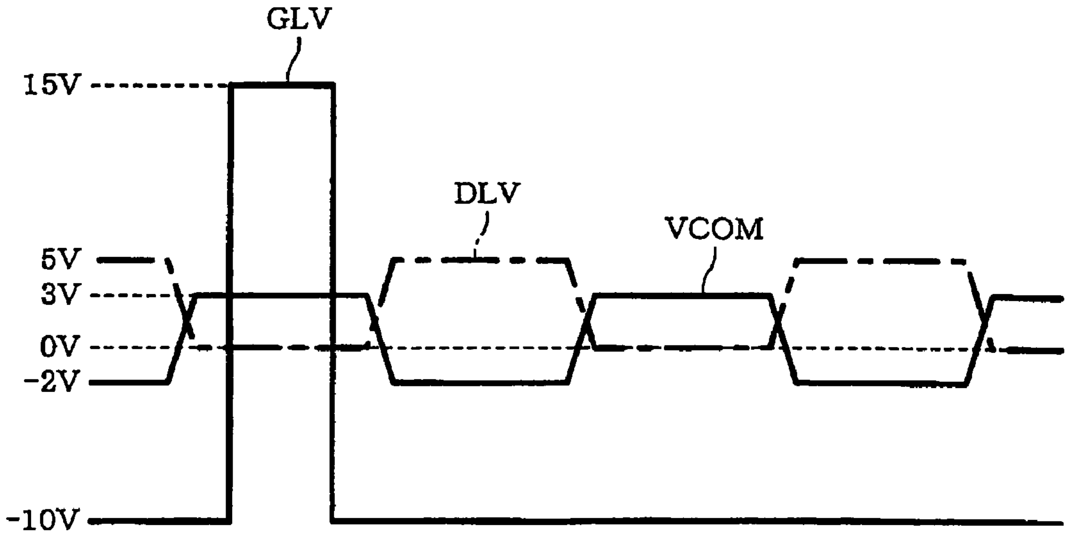
FIG. 12 is a view showing an example of the drive waveforms of a display panel shown in FIG. 2 or 3.

FIG. 12 shows an example of the drive waveforms of the display panel 12 shown in FIG. 2 or 3.

A grayscale voltage DLV corresponding to the grayscale value of the image data is applied to the source line. In FIG. 12, the grayscale voltage DLV has an amplitude of 5 V with respect to the system ground power supply voltage VSS (=0 V).

A scan voltage GLV at the low-potential-side voltage VEE (=−10 V) is applied to the gate line in an unselected state, and a scan voltage GLV at the high-potential-side voltage VDDHG (=−15 V) is applied to the gate line in a selected state.

The common electrode voltage VCOM at the high-potential-side voltage VCOMH (=3 V) or the low-potential-side voltage VCOML (=−2 V) is applied to the common electrode CE. The polarity of the voltage level of the common electrode voltage VCOM is reversed with respect to a given voltage in synchronization with the polarity inversion timing. FIG. 12 shows the waveform of the common electrode voltage VCOM during scan line inversion drive. The polarity of the grayscale voltage DLV applied to the source line is also reversed with respect to a given voltage in synchronization with the polarity inversion timing.

A liquid crystal element deteriorates when a direct-current voltage is applied for a long period of time. This makes it necessary to employ a drive method in which the polarity (sign) of the voltage applied to the liquid crystal element is reversed in units of specific periods. As such a drive method, frame inversion drive, scan (gate) line inversion drive, data (source) line inversion drive, dot inversion drive, and the like can be mentioned.

Frame inversion drive reduces power consumption, but results in an insufficient image quality. Data line inversion drive and dot inversion drive provide an excellent image quality, but require a high voltage for driving a display panel.

Figure 13:
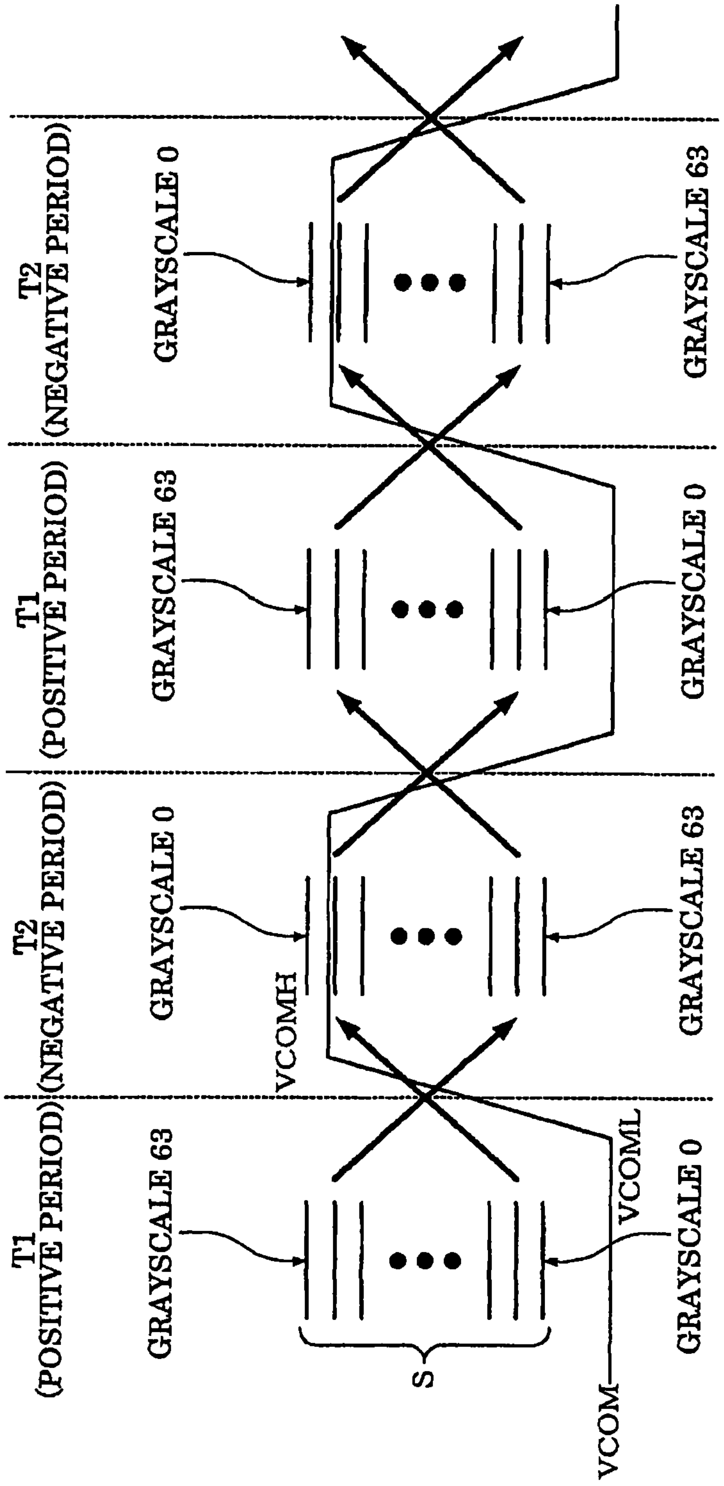
FIG. 13 is a view illustrative of polarity inversion drive according to one embodiment of the invention.

This embodiment employs scan line inversion drive (one-line inversion drive). In scan line inversion drive, the polarity of the voltage applied to the liquid crystal element is reversed in units of scan periods (gate lines). As shown in FIG. 13, a positive voltage is applied to the liquid crystal element in the first scan period (gate line), a negative voltage is applied to the liquid crystal element in the second scan period, and a positive voltage is applied to the liquid crystal element in the third scan period, for example. In the subsequent frame, a negative voltage is applied to the liquid crystal element in the first scan period, a positive voltage is applied to the liquid crystal element in the second scan period, and a negative voltage is applied to the liquid crystal element in the third scan period.

In scan line inversion drive, the polarity of the voltage level of the common electrode voltage VCOM applied to the common electrode CE is reversed in units of scan periods.

A positive period T1 is a period in which the voltage level of the pixel electrode to which the grayscale voltage is supplied through the source line becomes higher than the voltage level of the common electrode CE. In the period T1, a positive voltage is applied to the liquid crystal element. A negative period T2 is a period in which the voltage level of the pixel electrode to which the grayscale voltage is supplied through the source line becomes lower than the voltage level of the common electrode CE. In the period T2, a negative voltage is applied to the liquid crystal element.

The voltage necessary for driving the display panel can be reduced by thus reversing the polarity of the common electrode voltage VCOM. This makes it possible to reduce the withstand voltage of the driver circuit, whereby the driver circuit manufacturing process can be simplified and the manufacturing cost can be reduced.

3. Features of this Embodiment

In this embodiment, the display driver 60 receives an NTSC video signal or a PAL video signal from the host 40, and generates internal display panel drive synchronization signals. The display driver 60 drives the display panel 12 using the image data from the host 40 in synchronization with the synchronization signals. This enables the host 40 to control display of a CRT device (not shown), whereby the display driver 60 can drive the display panel 12 using the display control signal (image data and synchronization signal) for the CRT device from the host 40.

The NTSC system and the PAL system employ an interlaced scan in which the number of scan lines per frame (vertical scan period) is an odd number. Therefore, the host 40 alternately outputs the image data in the frame in which the number of scan lines is an even number and the image data in the frame in which the number of scan lines is an odd number. Specifically, horizontal scan periods in an even number and horizontal scan periods in an odd number are provided alternately in units of vertical scan periods. Therefore, the display driver 60 includes the television signal I/F circuit 62 so that the display driver 60 can convert the vertical synchronization signal VDO and the horizontal synchronization signal HDO from the host 40 to the vertical synchronization signal VDI and the horizontal synchronization signal HDI for driving the display panel, and can drive the display panel 12 using the image data from the host 40 in synchronization with the vertical synchronization signal VDI and the horizontal synchronization signal HDI.

Figure 14:
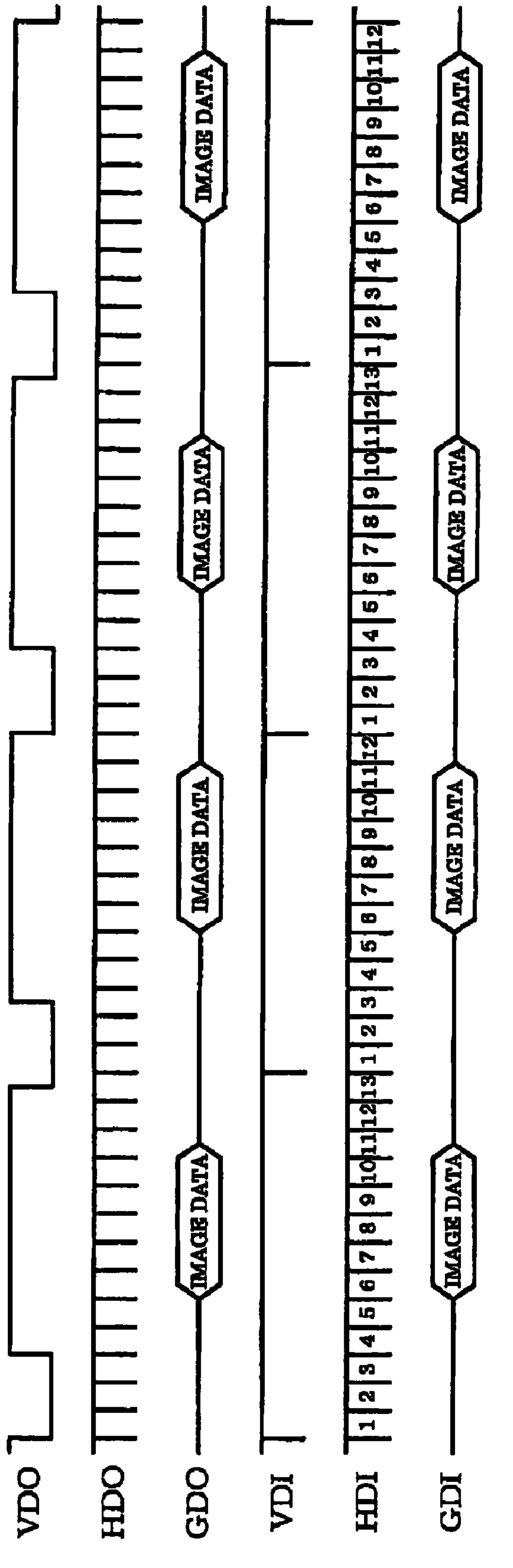
FIG. 14 is a view illustrative of an outline of the operation of a television signal I/F circuit according to one embodiment of the invention.

FIG. 14 is a view illustrative of an outline of the operation of the television signal I/F circuit 62 according to this embodiment.

FIG. 14 shows an example in which the number of scan lines of one frame is 25 for convenience of description. The host 40 generates the vertical synchronization signal VDO and the horizontal synchronization signal HDO, and alternately generates the image data GDO in a frame in which the number of scan lines is an odd number and the image data GDO in a frame in which the number of scan lines is an even number in frame units. In FIG. 14, a frame in which the number of scan lines is 13 and a frame in which the number of scan lines is 12 occur alternately.

The television signal I/F circuit 62 generates the vertical synchronization signal VDI and the horizontal synchronization signal HDI based on the vertical synchronization signal VDO and the horizontal synchronization signal HDO. The vertical synchronization signal VDI is generated so that the image data GDO is acquired with the same number of scan lines (horizontal scan periods) with respect to the edge (rising edge or falling edge) of the vertical synchronization signal VDI. In FIG. 14, the vertical synchronization signal VDI is generated so that the number of scan lines is five with respect to the falling edge of the vertical synchronization signal VDI.

Figure 15:
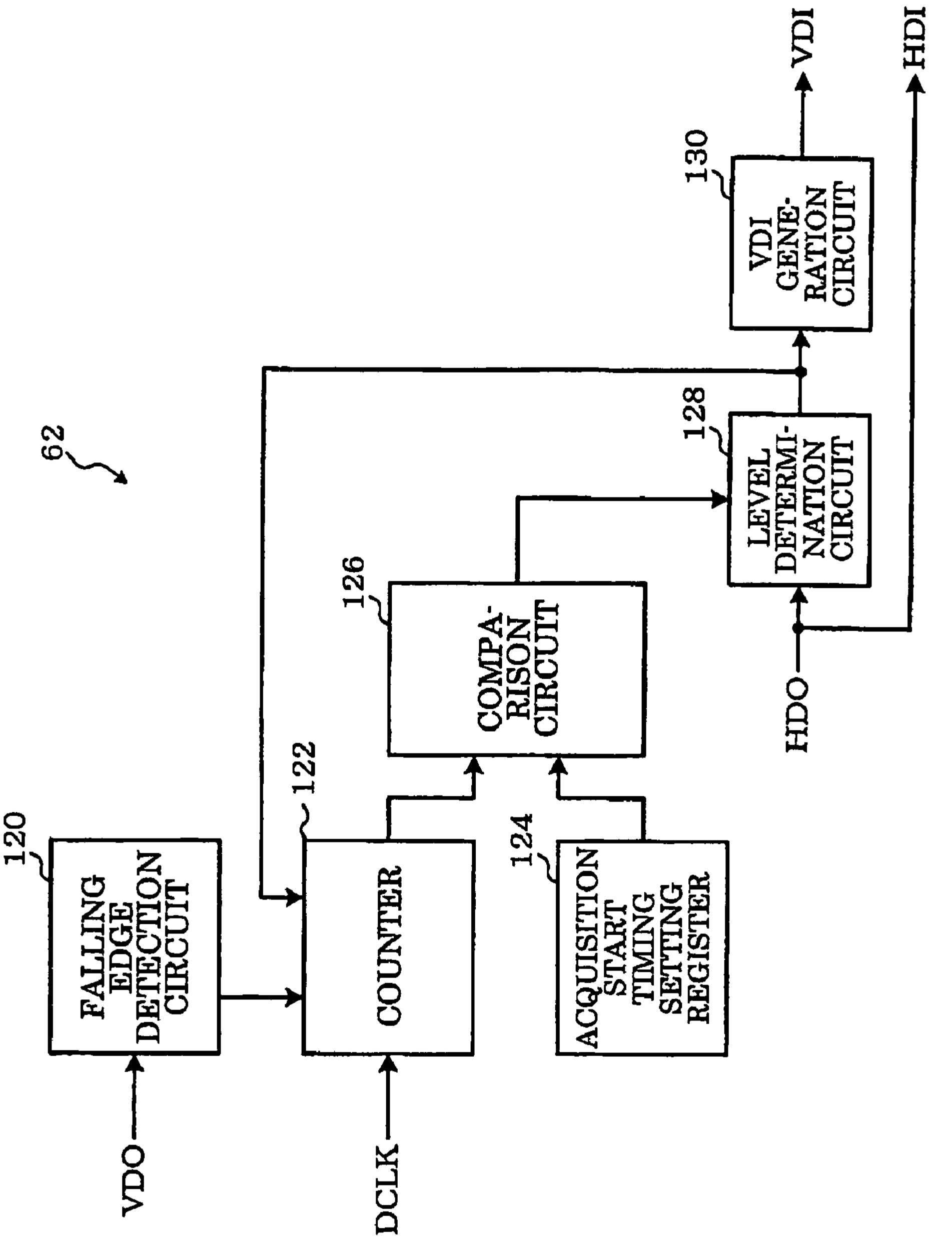
FIG. 15 is a block diagram showing a configuration example of the television signal I/F circuit.

FIG. 15 is a block diagram of a configuration example of the television signal I/F circuit 62.

The television signal I/F circuit 62 includes a falling edge detection circuit 120, a counter 122, an acquisition start timing setting register 124, a comparison circuit 126, a level determination circuit 128, and a VDI generation circuit 130.

The falling edge detection circuit 120 detects the falling edge of the vertical synchronization signal VDO from the host 40, and outputs a detection signal to the counter 122 when the falling edge detection circuit 120 has detected the rising edge. The counter 122 increments the count value in synchronization with a given reference clock signal or a dot clock signal DCLK which synchronizes with the transmission timing of the image data from the host 40. The counter 122 starts to increment the count value when the detection signal from the falling edge detection circuit 120 has become active. The number of clock pulses which specifies the image data acquisition start timing with respect to the edge of the vertical synchronization signal VDI is set in the acquisition start timing setting register 124 by the host 40, for example. The comparison circuit 126 compares the count value from the counter 122 with the value set in the acquisition start timing setting register 124, and outputs a coincidence pulse when these values coincide.

The horizontal synchronization signal HDO from the host 40 is input to the level determination circuit 128. The level determination circuit 128 determines the logic level of the horizontal synchronization signal HDO when the coincidence pulse from the comparison circuit 126 has become active. The determination result of the level determination circuit 128 is supplied to the VDI generation circuit 130 and the counter 122. When the level determination circuit 128 has determined that the horizontal synchronization signal HDO is set at the H level when the coincidence pulse from the comparison circuit 126 has become active, the count value of the counter 122 is initialized. When the level determination circuit 128 has determined that the horizontal synchronization signal HDO is set at the L level when the coincidence pulse from the comparison circuit 126 has become active, the VDI generation circuit 130 generates a pulse of the vertical synchronization signal VDI. The horizontal synchronization signal HDO is output as the horizontal synchronization signal HDI.

The vertical synchronization signal VDI and the horizontal synchronization signal HDI can be generated at the timings shown in FIG. 14 using the above configuration.

The analysis conducted by the inventor of the invention has revealed that the common electrode voltage changes depending on the relationship between the cycle of the charge-pump operation and the polarity inversion cycle of the common electrode when the number of scan lines alternately changes to an even number and an odd number in frame units, whereby a flickering phenomenon may occur due to the change in the voltage applied to the liquid crystal.

Figure 16:
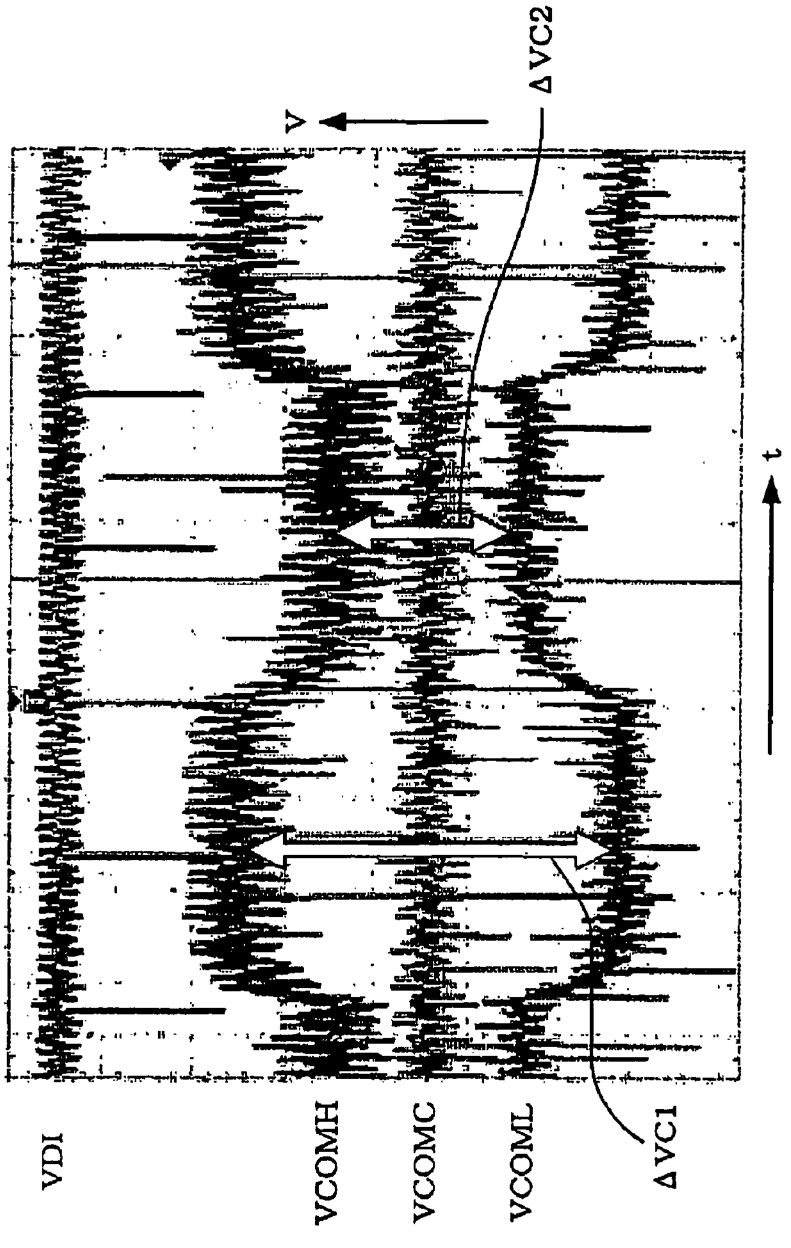
FIG. 16 is a waveform diagram showing a measurement example when a common electrode voltage changes.

FIG. 16 shows the waveform of a measurement example when the common electrode voltage changes.

The voltage levels of the high-potential-side voltage VCOMH and the low-potential-side voltage VCOML are normally constant with respect to a given voltage VCOMC, and the high-potential-side voltage VCOMH or the low-potential-side voltage VCOML at a constant level is output as the common electrode voltage VCOM in synchronization with the polarity inversion timing. In FIG. 16, the voltage levels of the high-potential-side voltage VCOMH and the low-potential-side voltage VCOML of the common electrode voltage VCOM change in a cycle of two vertical scan periods specified by the vertical synchronization signal VDI.

As a result, the potential difference between the high-potential-side voltage VCOMH and the low-potential-side voltage VCOML changes in units of two frames, whereby the voltage applied to the liquid crystal also changes in units of two frames. For example, even if the grayscale voltage of the source line (or the voltage of the pixel electrode) is the same, the voltage applied to the liquid crystal differs between the period in which the potential difference between the high-potential-side voltage VCOMH and the low-potential-side voltage VCOML is deltaVC1 and the period in which the potential difference between the high-potential-side voltage VCOMH and the low-potential-side voltage VCOML is deltaVC2. This causes a flickering phenomenon, whereby the display quality deteriorates.

This is considered to be caused by a phenomenon in which capacitive coupling occurs due to an inter-wire capacitance formed by disposing the signal line of the charge clock signal which specifies the cycle of the charge-pump operation adjacent to the signal line of the common electrode voltage VCOM, whereby the voltage level of the common electrode voltage VCOM (high-potential-side voltage VCOMH or low-potential-side voltage VCOML) changes at the change timing of the charge clock signal. Or, capacitive coupling occurs due to an inter-wire capacitance formed by disposing the signal line provided with the scan voltage of the gate line generated by the charge-pump operation adjacent to the signal line of the common electrode voltage VCOM, whereby the voltage level of the common electrode voltage VCOM (high-potential-side voltage VCOMH or low-potential-side voltage VCOML) changes due to a change in the high scan voltage in synchronization with the change timing of the charge clock signal.

Figure 17:
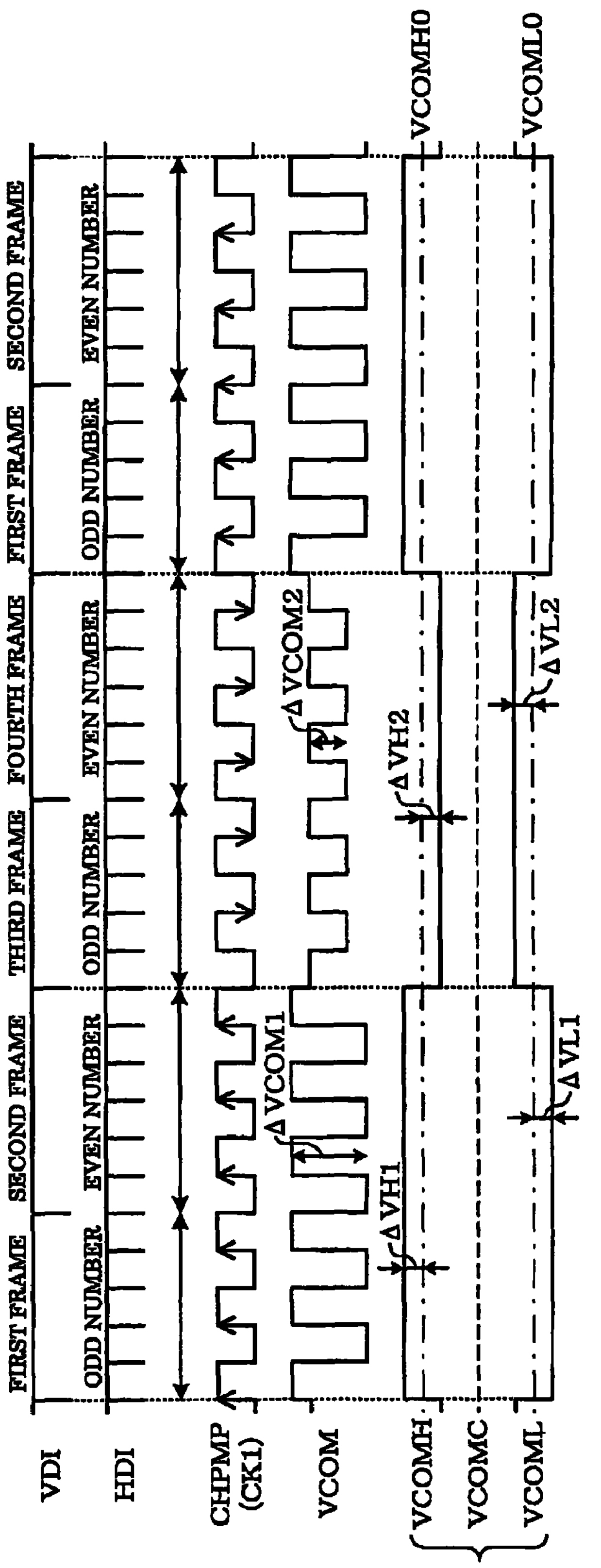
FIG. 17 is a view illustrative of the cause of a change in the voltage level of the common electrode voltage.

FIG. 17 is a view illustrative of the cause of a change in the voltage level of the common electrode voltage VCOM.

FIG. 17 shows an example in which the number of scan lines of one frame is 11 for convenience of description. In FIG. 17, a frame in which the number of scan lines is 5 and a frame in which the number of scan lines is 6 occur alternately. The charge clock signal CK1 shown in FIG. 8 or 9 is illustrated as the charge clock signal CHPMP, for example. One cycle of the charge clock signal CHPMP (CK1) is two horizontal scan periods. The common electrode voltage VCOM subjected to line inversion drive changes to the high-potential-side voltage VCOMH or the low-potential-side voltage VCOML in units of horizontal scan periods.

As shown in FIG. 17, in the first frame in which the number of scan lines is an odd number and the second frame in which the number of scan lines is an even number, the start timing of the period in which the common electrode voltage VCOM is set at the high-potential-side voltage VCOMH necessarily coincides with the rising edge of the charge clock signal CHPMP (CK1). As shown in FIG. 17, the start timing of the period in which the common electrode voltage VCOM is set at the low-potential-side voltage VCOML necessarily coincides with the falling edge of the charge clock signal CHPMP (CK1).

Therefore, capacitive coupling causes the voltage level of the high-potential-side voltage VCOMH to change (deltaVH1) toward the high-potential-side with respect to the high-potential-side voltage VCOMH0 which should be originally output, and causes the voltage level of the low-potential-side voltage VCOML to change (deltaVL1) toward the low-potential-side with respect to the low-potential-side voltage VCOML0 which should be originally output. Accordingly, the amplitude of the common electrode voltage VCOM is larger than the original amplitude of the common electrode voltage VCOM in the first and second frames (deltaVCOM1).

In the third and fourth frames, the start timing of the period in which the common electrode voltage VCOM is set at the high-potential-side voltage VCOMH necessarily coincides with the falling edge of the charge clock signal CHPMP (CK1), as shown in FIG. 17. As shown in FIG. 17, the start timing of the period in which the common electrode voltage VCOM is set at the low-potential-side voltage VCOML necessarily coincides with the rising edge of the charge clock signal CHPMP (CK1).

Therefore, capacitive coupling causes the voltage level of the high-potential-side voltage VCOMH to change (deltaVH2) toward the low-potential-side with respect to the high-potential-side voltage VCOMH0 which should be originally output, and causes the voltage level of the low-potential-side voltage VCOML to change (deltaVL2) toward the high-potential-side with respect to the low-potential-side voltage VCOML0 which should be originally output. Accordingly, the amplitude of the common electrode voltage VCOM is smaller than the original amplitude of the common electrode voltage VCOM in the third and fourth frames (deltaVCOM2<deltaVCOM1).

The above change in the voltage level occurs in two-frame cycle. As a result, the waveform shown in FIG. 16 is observed. Since the voltage levels of the high-potential-side voltage VCOMH and the low-potential-side voltage VCOML of the common electrode voltage VCOM change depending on the frame, as described above, the voltage applied to the liquid crystal changes even if the same grayscale voltage is applied to the pixel electrode in each frame.

In this embodiment, the charge clock signal CHPMP (CK1) is generated so that the charge clock signal CHPMP (CK1) has one or more rising edges and falling edges in the period in which the polarity (sign) of the voltage applied to the liquid crystal (voltage between the pixel electrode and the common electrode) is positive or negative. This causes the voltage levels of the high-potential-side voltage VCOMH and the low-potential-side voltage VCOML of the common electrode voltage VCOM to be constant, thereby preventing a situation in which the voltage applied to the liquid crystal changes when the same grayscale voltage is applied to the pixel electrode in each frame. This prevents deterioration in image quality.

Figure 18:
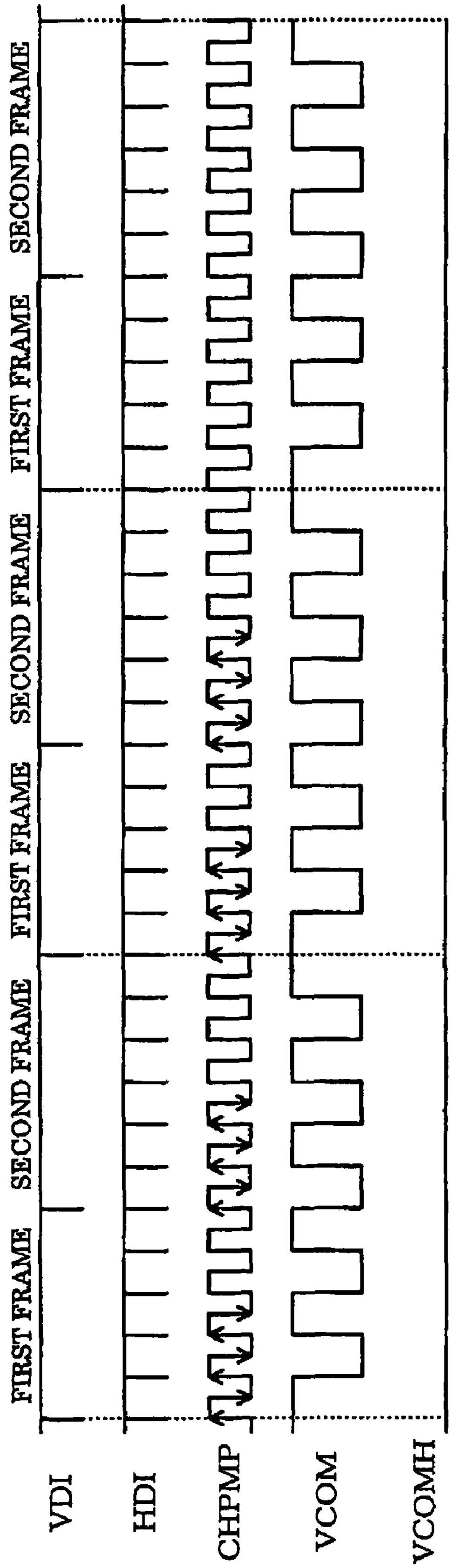
FIG. 18 is a view showing the relationship between the charge clock signal and the common electrode voltage according to one embodiment of the invention.

FIG. 18 shows the relationship between the charge clock signal and the common electrode voltage according to this embodiment.

FIG. 18 shows an example in which the number of scan lines of one frame is 11 for convenience of description. In FIG. 18, a frame in which the number of scan lines is 5 and a frame in which the number of scan lines is 6 occur alternately. The charge clock signal CK1 shown in FIG. 8 or 9 is illustrated as the charge clock signal CHPMP, for example. One cycle of the charge clock signal CHPMP (CK1) is two horizontal scan periods. FIG. 18 shows only the high-potential-side voltage VCOMH with the low-potential-side voltage VCOML omitted. The common electrode voltage VCOM subjected to line inversion drive changes to the high-potential-side voltage VCOMH or the low-potential-side voltage VCOML in units of horizontal scan periods.

In this embodiment, the charge clock signal CHPMP (CK1) has a rising edge and a falling edge in the period in which the common electrode voltage VCOM is set at the high-potential-side voltage VCOMH in the first frame in which the number of scan lines is an odd number and the second frame in which the number of scan lines is an even number. The charge clock signal CHPMP (CK1) also has a rising edge and a falling edge in the period in which the common electrode voltage VCOM is set at the low-potential-side voltage VCOML. This cancels the effects of a change in the charge clock signal CHPMP on the high-potential-side voltage VCOMH and cancels the effects of a change in the charge clock signal CHPMP on the low-potential-side voltage VCOML. Therefore, the voltage levels of the high-potential-side voltage VCOMH and the low-potential-side voltage VCOML of the common electrode voltage VCOM can be made constant in each frame, thereby preventing a situation in which the voltage applied to the liquid crystal changes when the same grayscale voltage is applied to the pixel electrode in each frame. As a result, deterioration in image quality is prevented. Specifically, a power supply circuit which stabilizes display quality by suppressing a flickering phenomenon, even if the number of scan lines of each frame differs, and a display driver including the same, and the like can be provided. According to this embodiment, deterioration in image quality can be prevented without taking into account the arrangement of the signal line of the charge clock signal CHPMP, the signal line of the common electrode voltage VCOM, the signal line of the high-potential-side voltage VCOMH, the signal line of the low-potential-side voltage VCOML, and the signal line of the boost voltage generated by the charge-pump operation.

3.1 Modification

This embodiment has been described above taking an example in which the charge clock signal generation circuit 58 of the power supply circuit 50 generates the charge clock signal CHPMP in a fixed cycle. Note that this embodiment is not limited thereto.

Figure 19:
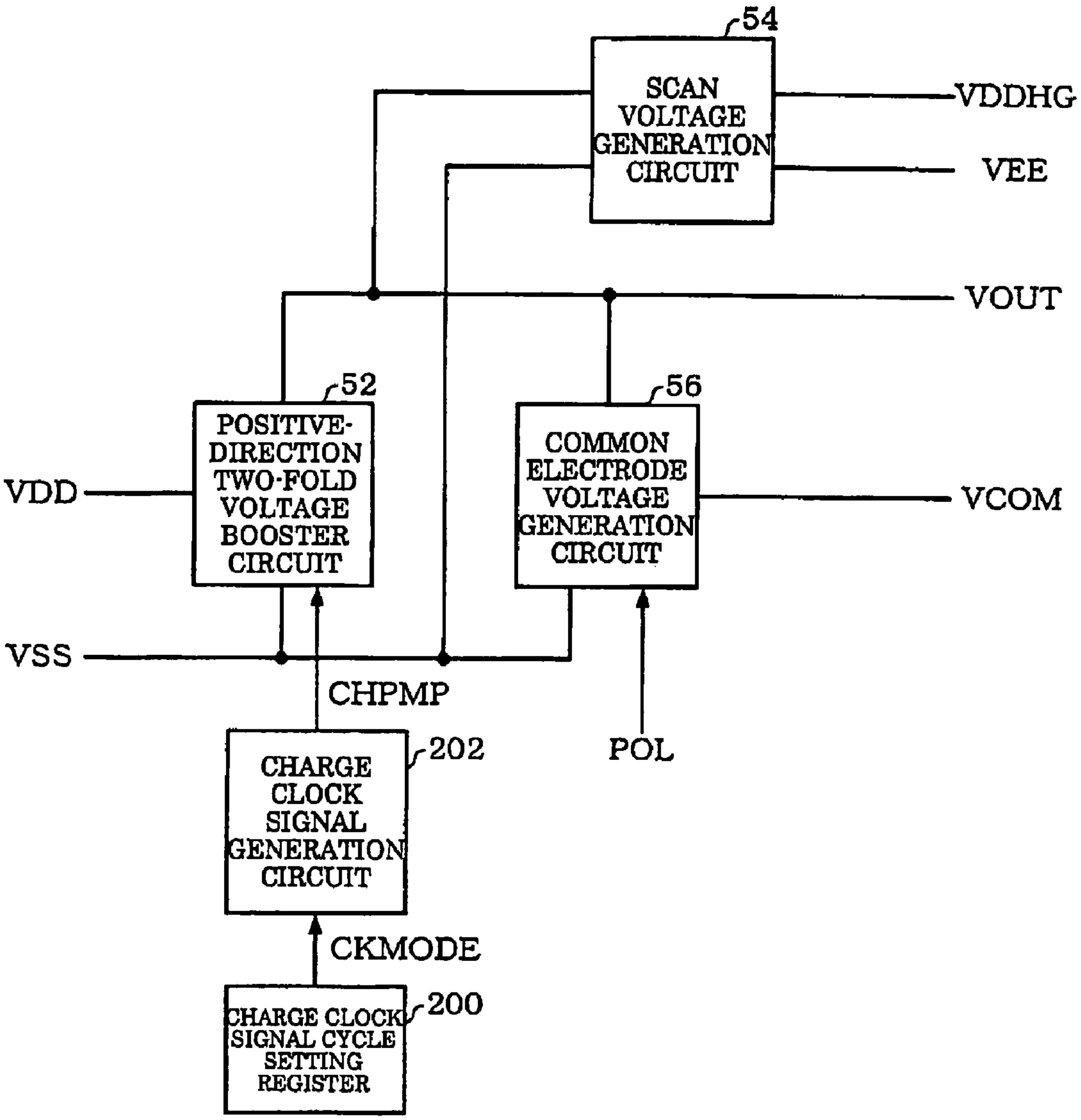
FIG. 19 is a block diagram showing a configuration example of a power supply circuit according to a first modification of one embodiment of the invention.

FIG. 19 is a block diagram of a configuration example of the power supply circuit 50 according to a first modification of this embodiment.

In FIG. 19, the same sections as in FIG. 7 are indicated by the same symbols. Description of these sections is appropriately omitted. The power supply circuit according to the first modification differs from the power supply circuit 50 shown in FIG. 7 in that a charge clock signal cycle setting register 200 is additionally provided. The charge clock signal generation circuit 202 provided instead of the charge clock signal generation circuit 58 generates the charge clock signal CHPMP in a cycle corresponding to a control value set in the charge clock signal cycle setting register 200.

The charge clock signal cycle setting register 200 is configured to be accessible by the host 40. The host 40 sets the control value which specifies the length (frequency) of the cycle of the charge clock signal CHPMP in the charge clock signal cycle setting register 200. The charge clock signal cycle setting register 200 supplies a control signal CKMODE corresponding to the control value to the charge clock signal generation circuit 202.

Figure 20:
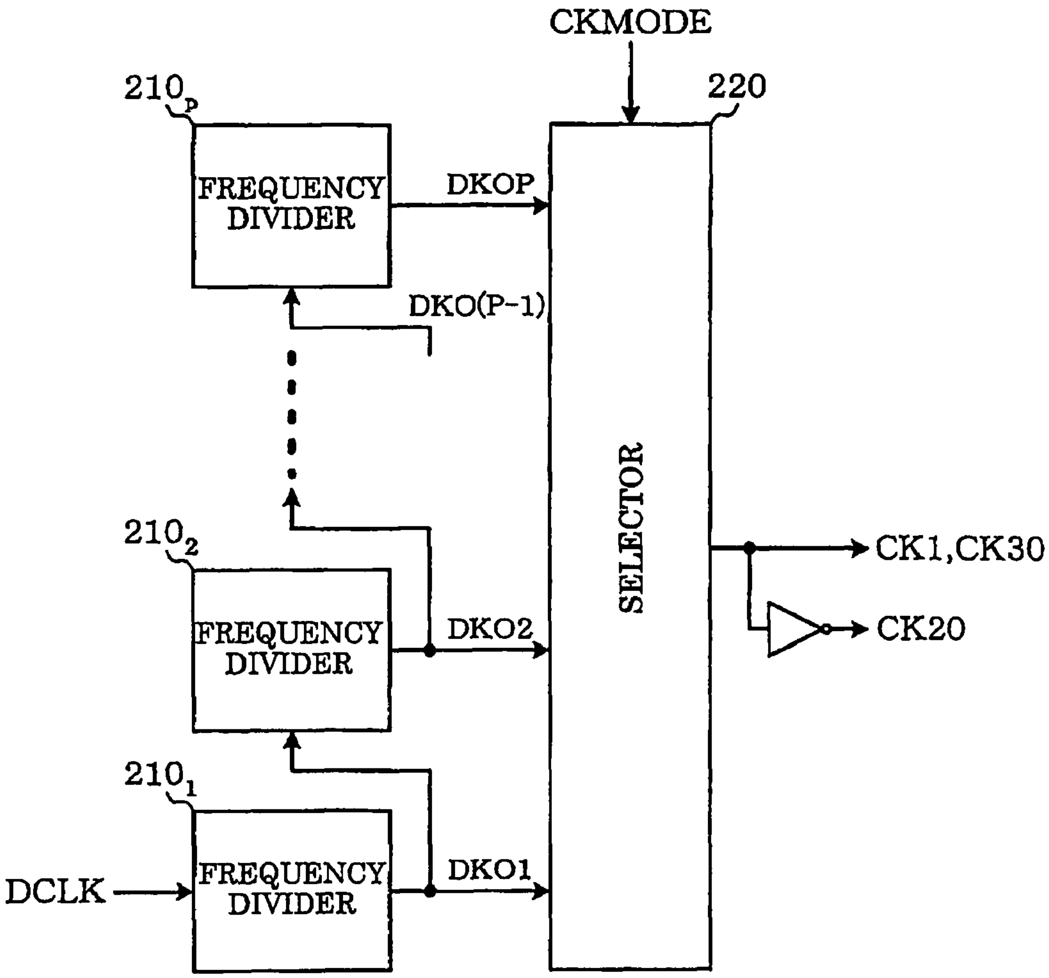
FIG. 20 is a block diagram showing a configuration example of a charge clock signal generation circuit shown in FIG. 19.

FIG. 20 is a block diagram of a configuration example of the charge clock signal generation circuit 202 shown in FIG. 19.

The charge clock signal generation circuit 202 includes frequency dividers $\mathbf{210}_1$ to $\mathbf{210}_p$ (P is an integer equal to or larger than two) and a selector 220. The frequency divider $\mathbf{210}_1$ is provided with the dot clock signal DCLK as a reference clock signal, and outputs a frequency-divided clock signal DKO1 obtained by dividing the frequency of the dot clock signal DCLK, for example. The frequency divider $\mathbf{210}_2$ is provided with the frequency-divided clock signal DKO1 which is the output from the frequency divider $\mathbf{210}_1$, and outputs a frequency-divided clock signal DKO2 obtained by dividing the frequency of the frequency-divided clock signal DKO1. Likewise, the frequency divider $\mathbf{210}_p$ is provided with the frequency-divided clock signal DKO(P−1) which is the output from the frequency divider $\mathbf{210}_{p-1}$, and outputs a frequency-divided clock signal DKOP obtained by dividing the frequency of the frequency-divided clock signal DKO(P−1).

The frequency-divided clock signals DKO1 to DKOP and the control signal CKMODE are input to the selector 220. The selector 220 outputs one of the frequency-divided clock signals DKO1 to DKOP as the charge clock signals CK1 and CK30 based on the control signal CKMODE. A charge clock signal CK20 is output by inverting the charge clock signal CK1.

The charge clock signals CK30 and CK20 are subjected to voltage level conversion and output as the charge clock signals CK3 and CK2.

The above configuration allows the charge clock signal generation circuit 202 to generate the charge clock signals CK1 to CK3 shown in FIG. 9, for example.

This embodiment has been described above taking an example in which the charge clock signal CHPMP (CK1) is generated so that the charge clock signal CHPMP (CK1) has one or more rising edges and falling edges in the period in which the polarity of the voltage applied to the liquid crystal (voltage between the pixel electrode and the common electrode) is positive or negative. Note that this embodiment is not limited thereto.

Figure 21:
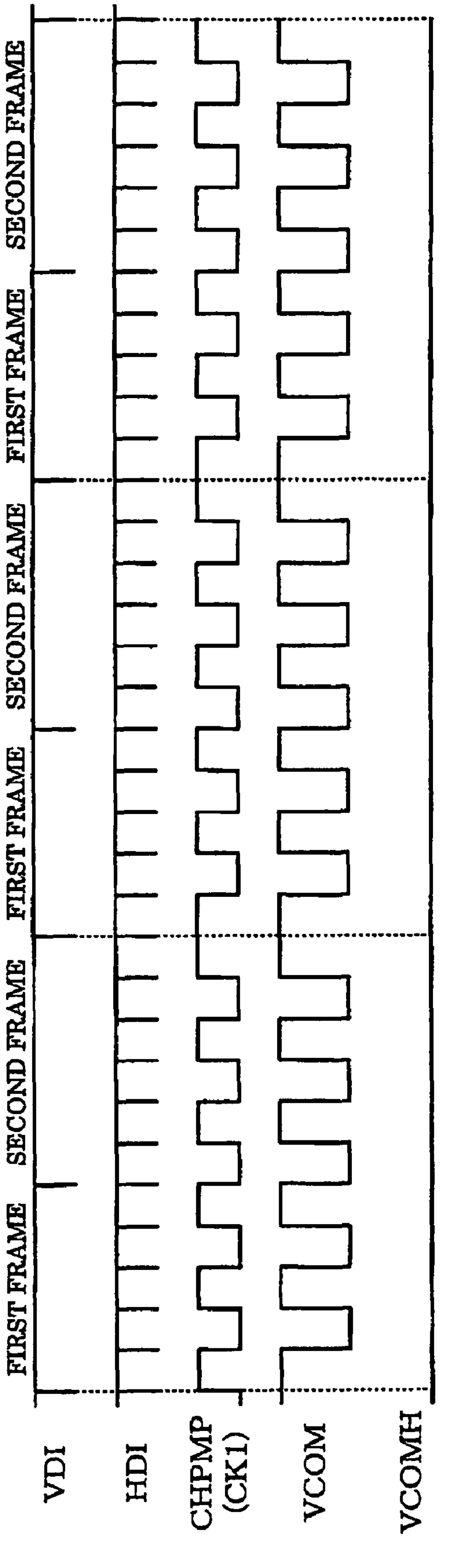
FIG. 21 is a view showing the relationship between the charge clock signal and the common electrode voltage according to a second modification of one embodiment of the invention.

FIG. 21 shows the relationship between the charge clock signal and the common electrode voltage according to a second modification of this embodiment.

FIG. 21 shows an example in which the number of scan lines of one frame is 11 for convenience of description in the same manner as FIG. 18. In FIG. 21, a frame in which the number of scan lines is 5 and a frame in which the number of scan lines is 6 occur alternately. The charge clock signal CK1 shown in FIG. 8 or 9 is illustrated as the charge clock signal CHPMP, for example. One cycle of the charge clock signal CHPMP (CK1) is two horizontal scan periods. FIG. 21 shows only the high-potential-side voltage VCOMH with the low-potential-side voltage VCOML omitted.

In the second modification, the change timing of the charge clock signal CHPMP (CK1) is the same as the change timing of the common electrode voltage VCOM, as shown in FIG. 21.

Therefore, the start timing of the period in which the common electrode voltage VCOM is set at the high-potential-side voltage VCOMH necessarily coincides with the rising edge of the charge clock signal CHPMP (CK1) in the first frame in which the number of scan lines is an odd number and the second frame in which the number of scan lines is an even number. As shown in FIG. 21, the start timing of the period in which the common electrode voltage VCOM is set at the low-potential-side voltage VCOML necessarily coincides with the falling edge of the charge clock signal CHPMP (CK1).

Therefore, capacitive coupling causes the voltage level of the high-potential-side voltage VCOMH to change toward the high-potential-side with respect to the high-potential-side voltage which should be originally output, and causes the voltage level of the low-potential-side voltage VCOML to change toward the low-potential-side with respect to the low-potential-side voltage which should be originally output in the same manner as in FIG. 17. Accordingly, the amplitude of the common electrode voltage VCOM is larger than the original amplitude of the common electrode voltage VCOM in the first and second frames.

As shown in FIG. 21, the start timing of the period in which the common electrode voltage VCOM is set at the high-potential-side voltage VCOMH necessarily coincides with the rising edge of the charge clock signal CHPMP (CK1) in the subsequent two frames. As shown in FIG. 21, the start timing of the period in which the common electrode voltage VCOM is set at the low-potential-side voltage VCOML necessarily coincides with the falling edge of the charge clock signal CHPMP (CK1). FIG. 21 differs from FIG. 17 as to this point. Therefore, the common electrode voltage VCOM changes in these two frames in the same manner as in the first and second frames. However, since the common electrode voltage VCOM changes similarly in each frame, the voltage level of the common electrode voltage VCOM does not change periodically. As a result, a situation in which the voltage applied to the liquid crystal changes can be prevented, even if the same grayscale voltage is applied to the pixel electrode in each frame.

4. Electronic Instrument

Figure 22:
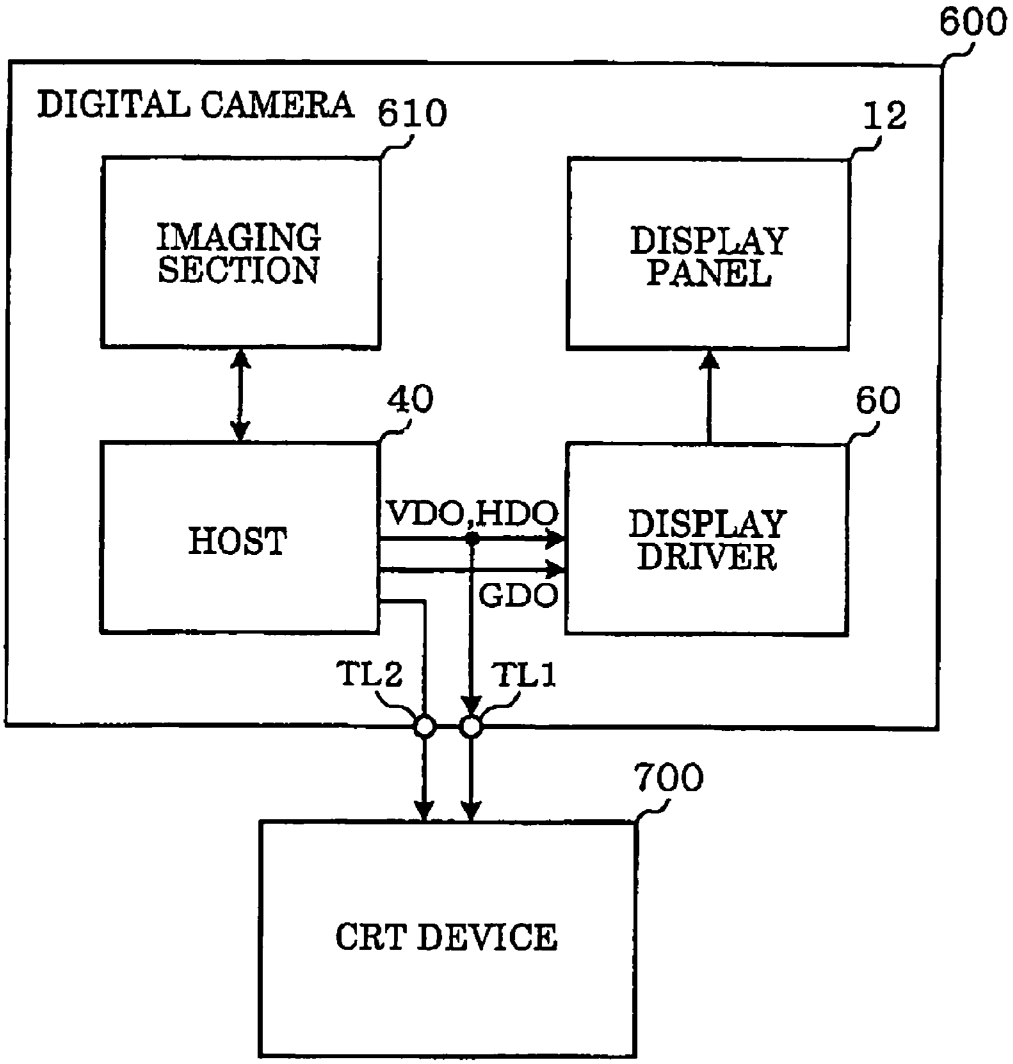
FIG. 22 is a block diagram showing an outline of the configuration of an electronic instrument to which the display driver according to one embodiment of the invention or the first or second modification is applied.

FIG. 22 is a block diagram showing an outline of the configuration of an electronic instrument to which the display driver according to this embodiment or the first or second modification is applied. FIG. 22 shows an outline of the configuration of a digital camera as the electronic instrument. In FIG. 22, the same sections as in FIG. 1 are indicated by the same symbols. Description of these sections is appropriately omitted.

A digital camera 600 includes an imaging section 610, the display panel 12, the host 40, and the display driver 60. The imaging section 610 includes a CCD camera, and supplies image data imaged using the CCD camera to the host 40.

The host 40 generates the vertical synchronization signal VDO, the horizontal synchronization signal HDO, and the image data GDO in accordance with the NTSC system or the PAL system, and supplies the vertical synchronization signal VDO, the horizontal synchronization signal HDO, and the image data GDO to the display driver 60. The display driver 60 converts the vertical synchronization signal VDO and the horizontal synchronization signal HDO to the vertical synchronization signal VDI and the horizontal synchronization signal HDI for driving the display panel, and drives the display panel 12.

The digital camera 600 includes connection terminals TL1 and TL2, and is connected with a CRT device 700 via the connection terminals TL1 and TL2. The vertical synchronization signal VDO and the horizontal synchronization signal HDO generated by the host 40 are supplied to the CRT device 700 via the connection terminal TL1. CRT device display image data generated by the host 40 is supplied to the CRT device 700 via the connection terminal TL2. The CRT device 700 displays an image based on the vertical synchronization signal VDO, the horizontal synchronization signal HDO, and the image data from the host 40.

As described above, the digital camera 600 can cause the CRT device 700 to display an image by supplying the display synchronization signals generated by the host 40 to the CRT device 700, and can cause the display panel 12 to display an image using the display driver 60.

Although only some embodiments of the invention have been described above in detail, those skilled in the art would readily appreciate that many modifications are possible in the embodiments without materially departing from the novel teachings and advantages of the invention. Accordingly, such modifications are intended to be included within the scope of the invention. For example, the invention may be applied not only to drive the above liquid crystal display panel, but also to drive an electroluminescent display device, a plasma display device, and the like.

Some of the requirements of any claim of the invention may be omitted from a dependent claim which depends on that claim. Some of the requirements of any independent claim of the invention may be allowed to depend on any other independent claim.

What is claimed is:

1. A power supply circuit that outputs a common electrode voltage to a common electrode of an electro-optical device, the common electrode being provided opposite to pixel electrodes, the power supply circuit comprising:

a charge clock generation circuit that generates a charge clock signal;

a voltage booster circuit that generates a boost voltage boosted by a charge-pump operation in synchronization with the charge clock signal; and a common electrode voltage generation circuit that outputs a high-potential-side voltage or a low-potential-side voltage to the common electrode as a common electrode voltage, the high-potential-side voltage and the low-potential-side voltage being generated based on the boost voltage, a number of scan lines per frame in a first vertical scan period being an odd number, the number of scan lines per frame in a second vertical scan period subsequent to the first vertical scan period being an even number, the charge clock signal having a rising edge and a falling edge in a positive period both in the first vertical scan period and the second vertical scan period, a sign of voltages between the pixel electrodes and the common electrode being positive in the positive period, the charge clock signal having the rising edge and the falling edge in a negative period both in the first vertical scan period and the second vertical scan period, the sign of voltages between the pixel electrodes and the common electrode being negative in the negative period.

2. The power supply circuit as defined in claim 1, further comprising:

a scan voltage generation circuit that generates a scan voltage applied to a gate line of the electro-optical device, the scan voltage generation circuit generating the scan voltage by a charge-pump operation in synchronization with the charge clock signal.

3. The power supply circuit as defined in claim 1, a period of one cycle of the charge clock signal has a same length of a horizontal scan period.

4. A driver circuit for driving an electro-optical device including a plurality of gate lines, a plurality of source lines, a plurality of pixel electrodes, and a plurality of switching elements, a switching element among the plurality of switching elements selected by a gate line among the plurality of gate lines electrically connecting a source line among the plurality of source lines and a pixel electrode among the plurality of pixel electrodes, the driver circuit comprising:

a source line driver circuit that drives the source lines; and the power supply circuit as defined in claim 1.

5. The driver circuit as defined in claim 4, further comprising a gate line driver circuit for scanning the gate lines.

6. An electro-optical device comprising:

a plurality of gate lines;

a plurality of source lines;

a plurality of pixel electrodes;

a plurality of switching elements, a switching element among the plurality of switching elements selected by a gate line among the plurality of gate lines electrically connecting a source line among the plurality of source lines and a pixel electrode among the plurality of pixel electrodes;

a common electrode provided opposite to the pixel electrode through an electro-optical material; and the power supply circuit as defined in claim 1.

7. The electro-optical device as defined in claim 6, further comprising a source line driver circuit that drives the source lines.

8. An electronic instrument comprising the electro-optical device as defined in claim 6.

9. An electronic instrument comprising the power supply circuit as defined in claim 1.

10. The power supply circuit according to claim 1, a change timing of the common electrode voltage corresponding to the rising edge of the charge clock signal in the first and second vertical scan periods.

11. A power supply circuit that outputs a common electrode voltage to a common electrode of an electro-optical device, the common electrode being provided opposite to pixel electrodes, the power supply circuit comprising:

a charge clock generation circuit that generates a charge clock signal;

a voltage booster circuit that generates a boost voltage boosted by a charge-pump operation in synchronization with the charge clock signal; and a common electrode voltage generation circuit that outputs a high-potential-side voltage or a low-potential-side voltage to the common electrode as a common electrode voltage, the high-potential-side voltage and the low-potential-side voltage being generated based on the boost voltage, a number of scan lines per frame in a first vertical scan period being an odd number, the number of scan lines per frame in a second vertical scan period subsequent to the first vertical scan period being an even number, the number of scan lines per frame in a third vertical scan period subsequent to the second vertical scan period being the odd number, the number of scan lines per frame in a fourth vertical scan period subsequent to the third vertical scan period being the even number, a change timing of the charge clock signal being the same as a change timing of the common electrode voltage in the first vertical scan period, the second vertical scan period, the third vertical scan period and the fourth vertical scan period, the charge clock signal keeping a same voltage when a vertical scan period changes from the second vertical scan period to the third vertical scan period.

12. A driver circuit for driving an electro-optical device including a plurality of gate lines, a plurality of source lines, a plurality of pixel electrodes, and a plurality of switching elements, a switching element among the plurality of switching elements selected by a gate line among the plurality of gate lines electrically connecting a source line among the plurality of source lines and a pixel electrode among the plurality of pixel electrodes, the driver circuit comprising:

a source line driver circuit that drives the source lines; and the power supply circuit as defined in claim 11.

13. An electro-optical device comprising:

a plurality of gate lines;

a plurality of source lines;

a plurality of pixel electrodes;

a plurality of switching elements, a switching element among the plurality of switching elements selected by a gate line among the plurality of gate lines electrically connecting a source line among the plurality of source lines and a pixel electrode among the plurality of pixel electrodes;

a common electrode provided opposite to the pixel electrode through an electro-optical material; and the power supply circuit as defined in claim 11.

14. An electronic instrument comprising the electro-optical device as defined in claim 13.

15. An electronic instrument comprising the power supply circuit as defined in claim 11.

16. A common electrode drive method for driving a common electrode of an electro-optical device, the common electrode provided opposite to pixel electrodes through an electro-optical material, the method comprising:

generating a charge clock signal;

generating a boost voltage boosted by a charge-pump operation in synchronization with the charge clock signal; and outputting a high-potential-side voltage or a low-potential-side voltage to the common electrode as a common electrode voltage, the high-potential-side voltage and the low-potential-side voltage being generated based on the boost voltage, a number of scan lines per frame in a first vertical scan period being an odd number, the number of scan lines per frame in a second vertical scan period subsequent to the first vertical scan period being an even number, the charge clock signal having a rising edge and a falling edge in a positive period both in the first vertical scan period and the second vertical scan period, a sign of voltages between the pixel electrodes and the common electrode being positive in the positive period, the charge clock signal having the rising edge and the falling edge in a negative period both in the first vertical scan period and the second vertical scan period, the sign of voltages between the pixel electrodes and the common electrode being negative in the negative period.

17. The common electrode drive method as defined in claim 16, a period of one cycle of the charge clock signal having a same length of a horizontal scan period.

18. A common electrode drive method for driving a common electrode of an electro-optical device, the common electrode provided opposite to pixel electrodes through an electro-optical material, the method comprising:

generating a charge clock signal;

generating a boost voltage boosted by a charge-pump operation in synchronization with the charge clock signal; and outputting a high-potential-side voltage or a low-potential-side voltage to the common electrode as a common electrode voltage, the high-potential-side voltage and the low-potential-side voltage being generated based on the boost voltage, a number of scan lines per frame in a first vertical scan period being an odd number, the number of scan lines per frame in a second vertical scan period subsequent to the first vertical scan period being an even number, the number of scan lines per frame in a third vertical scan period subsequent to the second vertical scan period being the odd number, the number of scan lines per frame in a fourth vertical scan period subsequent to the third vertical scan period being the even number, a change timing of the charge clock signal being the same as a change timing of the common electrode voltage in the first vertical scan period, the second vertical scan period, the third vertical scan period and the fourth vertical scan period, the charge clock signal keeping a same voltage when a vertical scan period changes from the second vertical scan period to the third vertical scan period.

* * * * *